United States Patent
Nakama

(10) Patent No.: US 9,571,756 B2
(45) Date of Patent: Feb. 14, 2017

(54) APPARATUS, METHOD FOR CONTROLLING APPARATUS, AND PROGRAM

(71) Applicant: CANON KABUSHIKI KAISHA, Tokyo (JP)

(72) Inventor: Satoshi Nakama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 14/508,863

(22) Filed: Oct. 7, 2014

(65) Prior Publication Data

US 2015/0103207 A1 Apr. 16, 2015

(30) Foreign Application Priority Data

Oct. 10, 2013 (JP) ................................. 2013-212751

(51) Int. Cl.
*H04N 5/272* (2006.01)
*G06T 11/00* (2006.01)

(52) U.S. Cl.
CPC ............. *H04N 5/272* (2013.01); *G06T 11/001* (2013.01)

(58) Field of Classification Search
CPC ......... H04N 5/265; H04N 5/272; H04N 5/278
See application file for complete search history.

(56) References Cited

U.S. PATENT DOCUMENTS

| 6,509,926 | B1* | 1/2003 | Mills ..................... | H04N 5/232 348/143 |
| 7,796,139 | B1* | 9/2010 | Feierbach ............... | G06T 11/60 345/469.1 |
| 2003/0137589 | A1* | 7/2003 | Miyata ................... | H04N 5/232 348/211.7 |
| 2005/0270372 | A1* | 12/2005 | Henninger, III ....... | H04N 5/232 348/143 |
| 2006/0203098 | A1* | 9/2006 | Henninger, III ....... | H04N 5/232 348/211.99 |
| 2006/0232587 | A1* | 10/2006 | Oh ......................... | G06T 11/001 345/467 |
| 2010/0054609 | A1* | 3/2010 | Kusakabe ............. | G06K 9/4604 382/203 |
| 2013/0044123 | A1* | 2/2013 | Shah ....................... | G06F 8/38 345/594 |
| 2013/0094034 | A1* | 4/2013 | Heckler ............... | H04N 1/3871 358/1.9 |

FOREIGN PATENT DOCUMENTS

JP H9-163258 A 6/1997

* cited by examiner

*Primary Examiner* — Jason Flohre
(74) *Attorney, Agent, or Firm* — Canon USA, Inc. IP Division

(57) ABSTRACT

An apparatus for communicating with an external apparatus through a network includes an image capture unit configured to capture an image of a subject, a superimposing unit configured to superimpose a character upon the captured image, a reception unit configured to receive color information indicating a color relating to the superimposed character, and a setting unit configured to set an outline color of the superimposed character based on the received color information.

18 Claims, 19 Drawing Sheets

FIG. 7A

```
<xs:complexType name="OSDConfiguration">
  <xs:complexContent>
    <xs:extension base="tt:DeviceEntity">
      <xs:sequence>
        <xs:element name="VideoSourceConfigurationToken" type="tt:OSDReference"/>
        <xs:element name="Type" type="tt:OSDType"/>
        <xs:element name="Position" type="tt:OSDPosConfiguration"/>
        <xs:element name="TextString" type="tt:OSDTextConfiguration" minOccurs="0"/>
        <xs:element name="Image" type="tt:OSDImgConfiguration" minOccurs="0"/>
        <xs:element name="Extension" type="tt:OSDConfigurationExtension" minOccurs="0"/>
      </xs:sequence>
      <xs:anyAttribute processContents="lax"/>
    </xs:extension>
  </xs:complexContent>
</xs:complexType>
```

FIG. 7B

```
<xs:complexType name="OSDReference">
  <xs:simpleContent>
    <xs:extension base="tt:ReferenceToken">
      <xs:anyAttribute processContents="lax"/>
    </xs:extension>
  </xs:simpleContent>
</xs:complexType>
```

FIG. 7C

```
<xs:simpleType name="OSDType">
  <xs:restriction base="xs:string">
    <xs:enumeration value="Text"/>
    <xs:enumeration value="Image"/>
    <xs:enumeration value="Extended"/>
  </xs:restriction>
</xs:simpleType>
```

FIG. 7D

```
<xs:complexType name="OSDPosConfiguration">
  <xs:sequence>
    <xs:element name="Type" type="xs:string"/>
    <xs:element name="Pos" type="tt:Vector" minOccurs="0"/>
    <xs:element name="Extension" type="tt:OSDPosConfigurationExtension" minOccurs="0"/>
  </xs:sequence>
  <xs:anyAttribute processContents="lax"/>
</xs:complexType>
```

FIG. 7E

```
<xs:complexType name="OSDTextConfiguration">
  <xs:sequence>
    <xs:element name="Type" type="xs:string"/>
    <xs:element name="DateFormat" type="xs:string" minOccurs="0"/>
    <xs:element name="TimeFormat" type="xs:string" minOccurs="0"/>
    <xs:element name="FontSize" type="xs:int" minOccurs="0"/>
    <xs:element name="FontColor" type="tt:OSDColor" minOccurs="0"/>
    <xs:element name="BackgroundColor" type="tt:OSDColor" minOccurs="0"/>
    <xs:element name="PlainText" type="xs:string" minOccurs="0"/>
    <xs:element name="Extension" type="tt:OSDTextConfigurationExtension" minOccurs="0"/>
  </xs:sequence>
  <xs:anyAttribute processContents="lax"/>
</xs:complexType>
```

FIG. 7F

```
<xs:complexType name="OSDImgConfiguration">
  <xs:sequence>
    <xs:element name="ImgPath" type="xs:anyURI"/>
    <xs:element name="Extension" type="tt:OSDImgConfigurationExtension" minOccurs="0"/>
  </xs:sequence>
  <xs:anyAttribute processContents="lax"/>
</xs:complexType>
```

FIG. 7G

```
<xs:complexType name="OSDConfigurationExtension">
  <xs:sequence>
    <xs:any namespace="##any" processContents="lax" minOccurs="0" maxOccurs="unbounded"/>
  </xs:sequence>
  <xs:anyAttribute processContents="lax"/>
</xs:complexType>
```

FIG. 8A

```
<xs:complexType name="OSDConfigurationOptions">
  <xs:sequence>
    <xs:element name="MaximumNumberOfOSDs" type="xs:int" />
    <xs:element name="Type" type="tt:OSDType" maxOccurs="unbounded" />
    <xs:element name="PositionOption" type="xs:string" maxOccurs="unbounded" />
    <xs:element name="TextOption" type="tt:OSDTextOptions" minOccurs="0" />
    <xs:element name="ImageOption" type="tt:OSDImgOptions" minOccurs="0" />
    <xs:element name="Extension" type="tt:OSDConfigurationOptionsExtension" minOccurs="0"/>
  </xs:sequence>
  <xs:anyAttribute processContents="lax"/>
</xs:complexType>
```

FIG. 8B

```
<xs:complexType name="OSDTextOptions">
  <xs:sequence>
    <xs:element name="Type" type="xs:string" maxOccurs="unbounded"/>
    <xs:element name="FontSizeRange" type="tt:IntRange" minOccurs="0"/>
    <xs:element name="DateFormat" type="xs:string" minOccurs="0" maxOccurs="unbounded"/>
    <xs:element name="TimeFormat" type="xs:string" minOccurs="0" maxOccurs="unbounded"/>
    <xs:element name="FontColor" type="tt:OSDColorOptions" minOccurs="0"/>
    <xs:element name="BackgroundColor" type="tt:OSDColorOptions" minOccurs="0"/>
    <xs:element name="Extension" type="tt:OSDTextOptionsExtension" minOccurs="0"/>
  </xs:sequence>
  <xs:anyAttribute processContents="lax"/>
</xs:complexType>
```

FIG. 8C

```
<xs:complexType name="OSDImgOptions">
    <xs:sequence>
        <xs:element name="ImagePath" type="xs:anyURI" maxOccurs="unbounded"/>
        <xs:element name="Extension" type="tt:OSDImgOptionsExtension" minOccurs="0"/>
    </xs:sequence>
    <xs:anyAttribute processContents="lax"/>
</xs:complexType>
```

FIG. 8D

```
<xs:complexType name="OSDConfigurationOptionsExtension">
    <xs:sequence>
        <xs:any namespace="##any" processContents="lax" minOccurs="0" maxOccurs="unbounded"/>
    </xs:sequence>
    <xs:anyAttribute processContents="lax"/>
</xs:complexType>
```

FIG. 8E

```
<xs:complexType name="IntRange">
    <xs:sequence>
        <xs:element name="Min" type="xs:int"/>
        <xs:element name="Max" type="xs:int"/>
    </xs:sequence>
</xs:complexType>
```

FIG. 9A

```
<xs:complexType name="OSDColorOptions">
    <xs:sequence>
        <xs:element name="Color" type="tt:ColorOptions" minOccurs="0"/>
        <xs:element name="Transparent" type="tt:IntRange" minOccurs="0"/>
        <xs:element name="Extension" type="tt:OSDColorOptionsExtension" minOccurs="0"/>
    </xs:sequence>
    <xs:anyAttribute processContents="lax"/>
</xs:complexType>
```

FIG. 9B

```
<xs:complexType name="OSDTextOptionsExtension">
    <xs:sequence>
        <xs:any namespace="##any" processContents="lax" minOccurs="0" maxOccurs="unbounded"/>
    </xs:sequence>
    <xs:anyAttribute processContents="lax"/>
</xs:complexType>
```

FIG. 9C

```
<xs:complexType name="ColorOptions">
    <xs:sequence>
        <xs:choice>
            <xs:element name="ColorList" type="tt:Color" maxOccurs="unbounded"/>
            <xs:element name="ColorspaceRange" type="tt:ColorspaceRange" maxOccurs="unbounded"/>
        </xs:choice>
    </xs:sequence>
    <xs:anyAttribute processContents="lax"/>
</xs:complexType>
```

FIG. 9D

```
<xs:complexType name="Color">
    <xs:attribute name="X" type="xs:float" use="required"/>
    <xs:attribute name="Y" type="xs:float" use="required"/>
    <xs:attribute name="Z" type="xs:float" use="required"/>
    <xs:attribute name="Colorspace" type="xs:anyURI"/>
</xs:complexType>
```

FIG. 9E

```
<xs:complexType name="ColorspaceRange">
    <xs:sequence>
        <xs:element name="X" type="tt:FloatRange"/>
        <xs:element name="Y" type="tt:FloatRange"/>
        <xs:element name="Z" type="tt:FloatRange"/>
        <xs:element name="Colorspace" type="xs:anyURI"/>
    </xs:sequence>
    <xs:anyAttribute processContents="lax"/>
</xs:complexType>
```

FIG. 9F

```
<xs:complexType name="FloatRange">
    <xs:sequence>
        <xs:element name="Min" type="xs:float"/>
        <xs:element name="Max" type="xs:float"/>
    </xs:sequence>
</xs:complexType>
```

FIG. 12

```
<?xml version="1.0" encoding="UTF-8"?>
<SOAP-ENV:Envelope
 xmlns:SOAP-ENV="http://www.w3.org/2003/05/soap-envelope"
 xmlns:tt="http://www.onvif.org/ver10/schema"
 xmlns:trt="http://www.onvif.org/ver10/media/wsdl">
<SOAP-ENV:Header>
. . . . .
</SOAP-ENV:Header>
<SOAP-ENV:Body>
   <trt:SetOSD>
      <trt:OSD token="osd-1">
         <tt:VideoSourceConfigurationToken>0</tt:VideoSourceConfigurationToken>
         <tt:Type>Text</tt:Type>
         <tt:Position>
            <tt:Type>UpperLeft</tt:Type>
         </tt:Position>
         <tt:TextString>
            <tt:Type>Date</tt:Type>
         </tt:TextString>
      </trt:OSD>
   </trt:SetOSD>
</SOAP-ENV:Body>
</SOAP-ENV:Envelope>
```

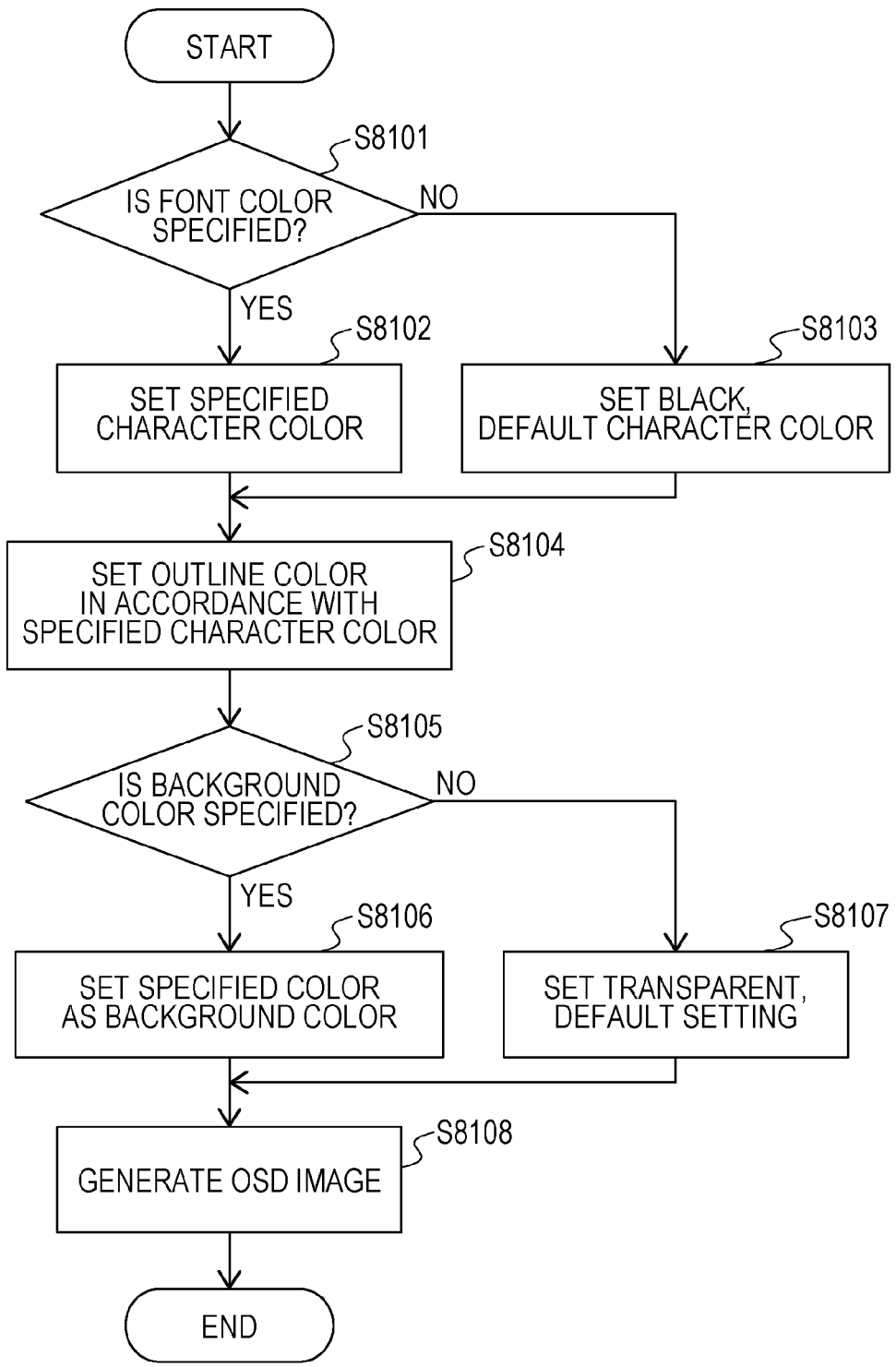

FIG. 15

```
. . . . .
<tt:Extension>
    <aa:OutlineColor>
        <tt:Color>
            <tt:ColorList X="0.0" Y="0.0" Z="0.0"/>
            <tt:ColorList X="1.0" Y="0.0" Z="0.0"/>
            <tt:ColorList X="1.0" Y="1.0" Z="0.0"/>
            <tt:ColorList X="0.0" Y="1.0" Z="0.0"/>
            <tt:ColorList X="0.0" Y="1.0" Z="1.0"/>
            <tt:ColorList X="0.0" Y="0.0" Z="1.0"/>
            <tt:ColorList X="1.0" Y="0.0" Z="1.0"/>
            <tt:ColorList X="1.0" Y="1.0" Z="1.0"/>
        </tt:Color>
        <tt:Transparent>
            <tt:Min>0</tt:Min>
            <tt:Max>1</tt:Max>
        </tt:Transparent>
    </aa:OutlineColor>
</tt:Extension>
. . . . .
```

APPARATUS, METHOD FOR CONTROLLING APPARATUS, AND PROGRAM

BACKGROUND OF THE INVENTION

Field of the Invention

The present invention relates to an apparatus, a method for controlling the apparatus, and a program and, more particularly, to a technique for superimposing information such as an image upon a captured image.

Description of the Related Art

Currently, a function of superimposing an image such as certain characters, a certain figure, or the like upon another image at a certain position is known. For example, an on-screen display (hereinafter also referred to as OSD) function of displaying an OSD image in another image at a fixed position and the like are known.

In Japanese Patent Laid-Open No. 9-163258, an image device that outputs control command data for OSD to an interface cable and an image device that receives the control command data output to the interface cable are disclosed.

The above technique only combines OSD data with an image signal from an image signal supply source on the basis of the control command data. Therefore, a foreground color in a superimposed image and a background color in the superimposed image become similar to each other, thereby undesirably making the superimposed image difficult to recognize.

SUMMARY OF THE INVENTION

The present invention provides an apparatus for communicating with an external apparatus through a network. The apparatus includes an image capture unit configured to capture an image of a subject, a superimposing unit configured to superimpose a character upon the captured image, a reception unit configured to receive color information indicating a color relating to the superimposed character, and a setting unit configured to set an outline color of the superimposed character based on the received color information.

In addition, the present invention provides an apparatus for communicating with an external apparatus through a network. The apparatus includes an image capture unit configured to capture an image of a subject, a superimposing unit configured to superimpose a character upon the captured image, a reception unit configured to receive color information regarding the superimposed character, and a control unit configured to control the superimposing unit based on the received color information. In the received color information, a foreground color, a background color, and an outline color of the superimposed character are separately described.

In addition, the present invention provides a method for controlling an apparatus for communicating with an external apparatus through a network. The method includes capturing an image of a subject, superimposing a character upon the captured image, receiving color information indicating a color relating to the superimposed character, and setting an outline color of the superimposed character based on the received color information.

In addition, the present invention provides a method for controlling an apparatus for communicating with an external apparatus through a network. The method includes capturing an image of a subject, superimposing a character upon the captured image, receiving color information regarding the superimposed character, and controlling the superimposing based on the received color information. In the received color information, a foreground color, a background color, and an outline color of the superimposed character are separately described.

In addition, the present invention provides a program for controlling an apparatus for communicating with an external apparatus through a network. The program causes a computer to execute capturing an image of a subject, superimposing a character upon the captured image, receiving color information indicating a color relating to the superimposed character, and setting an outline color of the superimposed character based on the received color information.

In addition, the present invention provides a program for controlling an apparatus for communicating with an external apparatus through a network. The program causes a computer to execute capturing an image of a subject, superimposing a character upon the captured image, receiving color information regarding the superimposed character, and controlling the superimposing based on the received color information. In the received color information, a foreground color, a background color, and an outline color of the superimposed character are separately described.

Further features of the present invention will become apparent from the following description of exemplary embodiments with reference to the attached drawings.

BRIEF DESCRIPTION OF THE DRAWINGS

FIGS. 7A to 7G are diagrams illustrating examples of a definition of an OSDConfiguration type according to the first embodiment of the present invention.

FIGS. 8A to 8E are diagrams illustrating examples of a definition of an OSDConfigurationOptions type according to the first embodiment of the present invention.

FIGS. 9A to 9F are diagrams illustrating examples of the definition of the OSDConfigurationOptions type according to the first embodiment of the present invention.

FIG. 12 is a diagram illustrating an example of the configuration of a SetOSD command.

FIG. 13 is a flowchart illustrating an example of a process for generating an OSD image on the basis of a SetOSD command received by a monitoring camera according to a second embodiment of the present invention.

FIG. 15 is a diagram illustrating an example of the configuration of a response to a GetOSD command according to a fourth embodiment of the present invention.

DESCRIPTION OF THE EMBODIMENTS

Embodiments of the present invention will be described in detail hereinafter on the basis of the accompanying drawings. It is to be noted that configurations described in the following embodiments are merely examples, and the present invention is not limited to the illustrated configurations.

First Embodiment

A network configuration according to this embodiment will be described hereinafter with reference to FIGS. 1A and 1B.

Figure 1A:
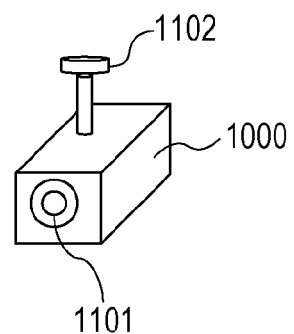
FIG. 1A is a block diagram illustrating an example of a monitoring camera according to a first embodiment of the present invention.

FIG. 1A is a diagram illustrating an example of a monitoring camera according to this embodiment. A monitoring camera 1000 illustrated in FIG. 1 includes a case 1101 including a lens and an arm mechanism 1102. The arm mechanism 1102 hangs the monitoring camera 1000 from an installation position such as a ceiling. In addition, the arm mechanism 1102 can change the image capture direction of the monitoring camera 1000 by rotating the case 1101 in a pan direction and a tilt direction and can fix the monitoring camera 1000 in a certain image capture direction.

The monitoring camera 1000 in this embodiment is an image capture apparatus that captures moving images and, more specifically, is a network camera used for monitoring. In addition, the arm mechanism 1102 is provided with a stepping motor for rotating the case 1101 in the pan direction and a stepping motor for rotating the case 1101 in the tilt direction.

Figure 1B:
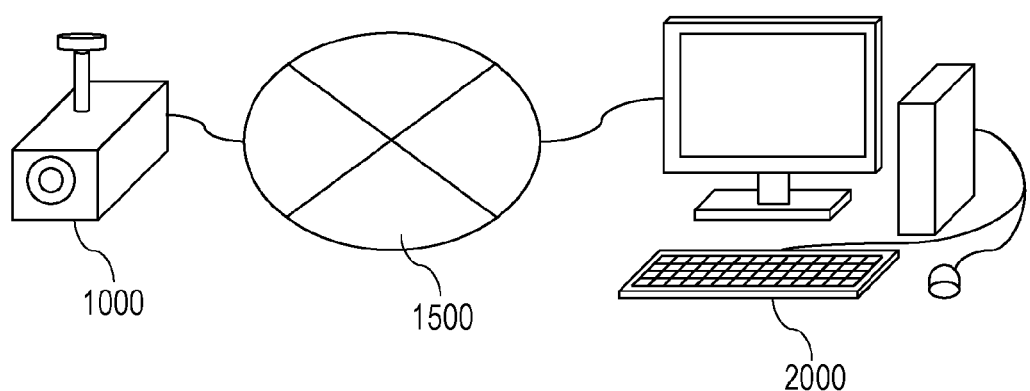
FIG. 1B is a diagram illustrating an example of the system configuration of a monitoring system according to the first embodiment of the present invention.

Next, FIG. 1B is a diagram illustrating an example of the system configuration of a monitoring system according to this embodiment. In the monitoring system in this embodiment, the monitoring camera 1000 and a client apparatus 2000 are communicably connected to each other through an Internet Protocol (IP) network 1500 (through a network).

It is to be noted that the client apparatus 2000 in this embodiment is an example of an external apparatus such as a personal computer (PC). In addition, the monitoring system in this embodiment corresponds to an image capture system.

The IP network 1500 includes, for example, a plurality of routers, switches, and cables that satisfy a communication standard such as Ethernet. In this embodiment, however, any type of communication standard, magnitude, and configuration may be used insofar as the monitoring camera 1000 and the client apparatus 2000 can communicate with each other.

For example, the IP network 1500 may be configured by the Internet, a wired local area network (LAN), a wireless LAN, a wide area network (WAN), or the like. The monitoring camera 1000 in this embodiment may be, for example, operable with Power over Ethernet (PoE; registered trademark), and power may be supplied to the monitoring camera 1000 through a LAN cable.

The client apparatus 2000 transmits various commands to the monitoring camera 1000. These commands include, for example, a command for changing an image capture parameter, which will be described later, and a command for starting image streaming. Details of the commands will be described later. The monitoring camera 1000 transmits responses to the commands and image streaming to the client apparatus 2000.

Figure 2:
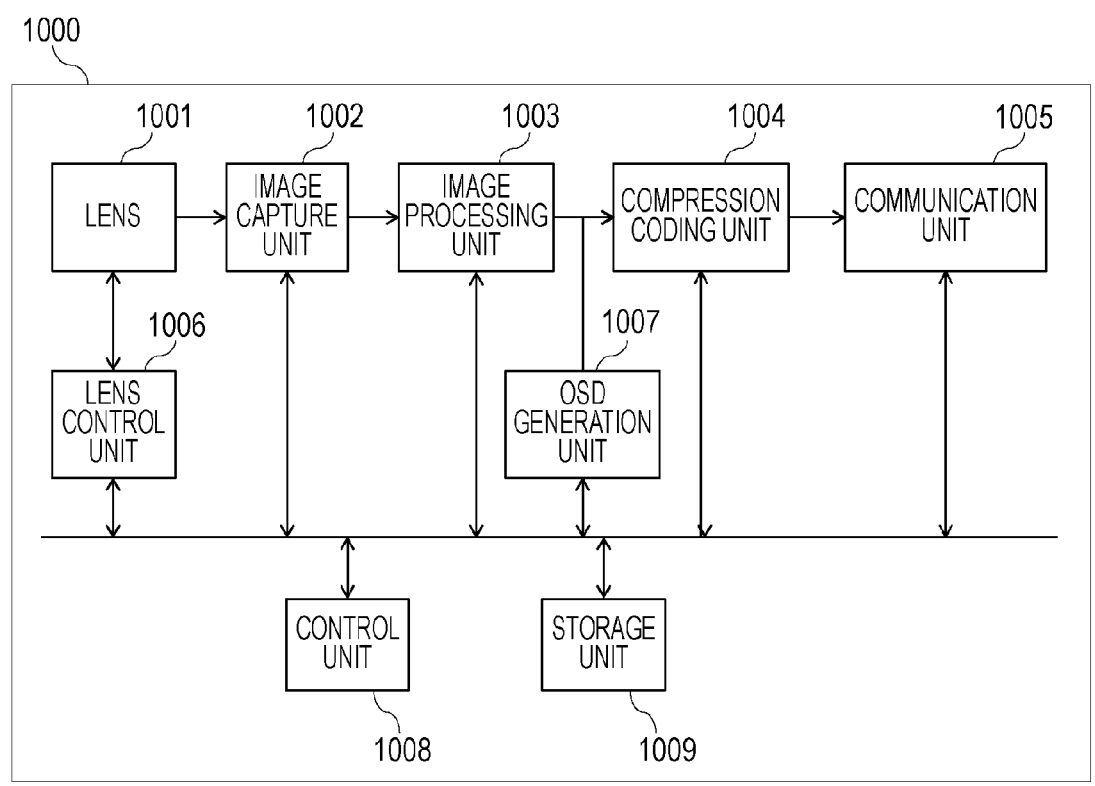
FIG. 2 is a diagram illustrating an example of the hardware configuration of the monitoring camera according to the first embodiment of the present invention.

Next, FIG. 2 is a diagram illustrating an example of the hardware configuration of the monitoring camera 1000 according to this embodiment. In FIG. 2, a lens 1001 forms an image of a subject on an image capture unit 1002. The image capture unit 1002 generates a captured image by capturing the image of the subject formed by the lens 1001. The image capture unit 1002 then outputs the generated captured image to an image processing unit 1003.

The image processing unit 1003 performs image processing on the captured image output from the image capture unit 1002 in accordance with an instruction from a control unit 1008, which will be described later. The image processing unit 1003 then outputs the captured image subjected to the image processing to a compression coding unit 1004. The compression coding unit 1004 performs compression coding on the captured image output from the image processing unit 1003 in accordance with an instruction from the control unit 1008.

The communication unit 1005 delivers the captured image subjected to the compression coding in the compression coding unit 1004 to the client apparatus 2000 through the IP network 1500. The communication unit 1005 then receives OSD setting commands transmitted from the client apparatus 2000 through the IP network 1500. Furthermore, the communication unit 1005 receives coding setting commands transmitted from the client apparatus 2000 through the IP network 1500.

The communication unit 1005 also receives setting commands (hereinafter also referred to as image setting commands) for the captured image. The image setting commands include, for example, a command for setting an image size and setting commands relating to exposure control such as white balance and gain control for the image of the subject. The communication unit 1005 in this embodiment corresponds to a reception unit that receives an image from the client apparatus 2000.

The lens control unit 1006 controls the lens 1001, for example, in such a way as to adjust a diaphragm, realize focus adjustment by adjusting a focus position, and insert or remove an infrared blocking filter in accordance with the image of the subject. The OSD generation unit 1007 generates an OSD image in accordance with an instruction from the control unit 1008. The OSD generation unit 1007 then outputs the generated OSD image to the compression coding unit 1004.

Here, the compression coding unit 1004 combines the OSD image output from the OSD generation unit 1007 with the captured image output from the image processing unit 1003. For example, the compression coding unit 1004 superimposes the OSD image output from the OSD generation unit 1007 upon the captured image output from the image processing unit 1003. Next, the compression coding unit 1004 performs compression coding on a captured image obtained as a result of the combining. The compression coding unit 1004 then outputs the captured image subjected to the compression coding to the communication unit 1005.

The compression coding unit 1004 in this embodiment corresponds to a superimposing unit that superimposes an OSD image upon a captured image output from the image capture unit 1002. The OSD image in this embodiment corresponds to superimposing information.

The control unit 1008 controls the entirety of the monitoring camera 1000. The control unit 1008 includes, for example, a central processing unit (CPU) and executes programs stored in a storage unit 1009, which will be described later. Alternatively, the control unit 1008 may perform control using hardware.

The control unit 1008 analyzes the image setting commands received by the communication unit 1005. Next, the control unit 1008 generates image setting information on the basis of the analyzed image setting commands. The control unit 1008 then outputs the generated image setting information to the image processing unit 1003 while storing the generated image setting information in the storage unit 1009.

The image processing unit 1003 performs image processing on the captured image output from the image capture unit 1002 in accordance with the image setting information output from the control unit 1008 and outputs the captured image subjected to the image processing to the compression coding unit 1004.

The control unit 1008 analyzes the OSD setting commands received by the communication unit 1005. Next, the control unit 1008 generates OSD setting information on the basis of the analyzed OSD setting commands. The control unit 1008 then outputs the generated OSD setting information to the OSD generation unit 1007 while storing the generated OSD setting information in the storage unit 1009.

It is to be noted that the OSD generation unit 1007 generates an OSD image in accordance with the OSD setting information output from the control unit 1008. The OSD setting information includes the colors of the OSD image and superimposing position information. Here, the superimposing position information is information indicating a position in the captured image output from the image processing unit 1003 at which the OSD image is superimposed.

The control unit 1008 analyzes the coding setting commands received by the communication unit 1005. Next, the control unit 1008 generates coding setting information on the basis of the analyzed coding setting commands. After storing the generated coding setting information in the storage unit 1009, the control unit 1008 outputs the generated coding setting information to the compression coding unit 1004.

The coding setting information output from the control unit 1008 includes, for example, specification information regarding a coding scheme for data, an image size (or the resolution of the image), and the like.

The compression coding unit 1004 converts the captured image output from the image processing unit 1003 into an image of a size or resolution specified by the coding setting information output from the control unit 1008. Alternatively, the compression coding unit 1004 converts the image obtained by combining the OSD image output from the OSD generation unit 1007 with the captured image output from the image processing unit 1003 into an image of a size or resolution specified by the coding setting information output from the control unit 1008.

The compression coding unit 1004 then performs compression coding on the captured image obtained as a result of the conversion using the coding scheme specified by the coding setting information output from the control unit 1008. In this embodiment, the specified coding scheme may be, for example, Joint Photographic Experts Group (JPEG), Moving Picture Experts Group (MPEG), H.264, H.265, or the like.

By operating in the above-described manner, the monitoring camera 1000 in this embodiment can convert an image of the same subject into a plurality of images whose sizes are different. In addition, the monitoring camera 1000 can obtain, as a result of the compression coding performed on the plurality of images obtained as a result of the conversion, a plurality of images for which different coding schemes have been used. The monitoring camera 1000 can then stream the plurality of images obtained as a result of the compression coding at substantially the same time.

The images to be streamed are output to the outside through the communication unit 1005.

Figure 17:
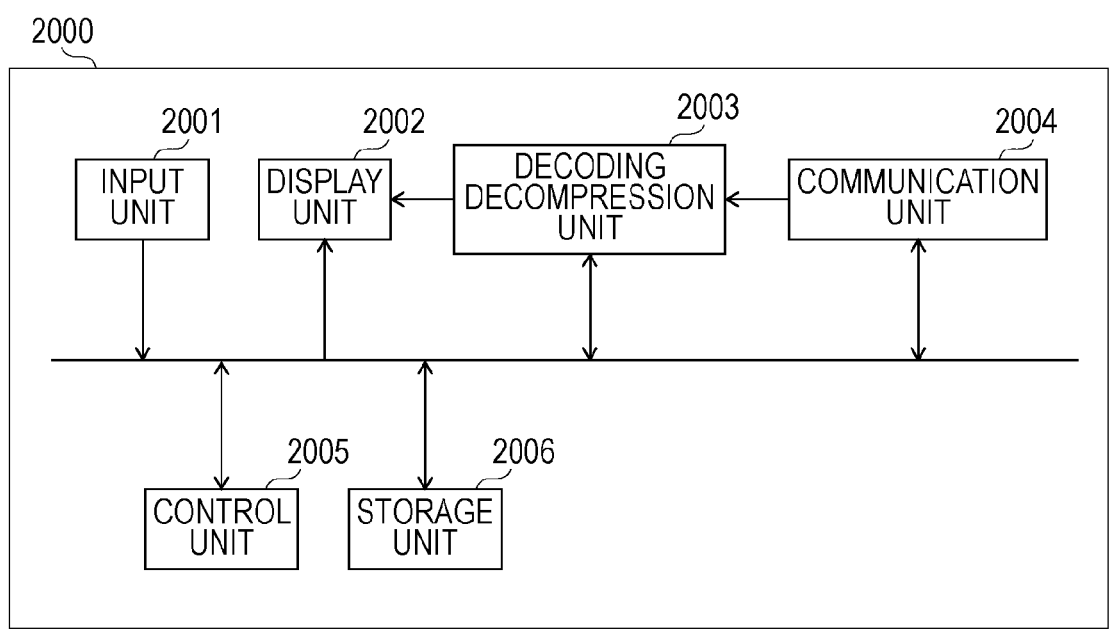
FIG. 17 is a diagram illustrating an example of the hardware configuration of the client apparatus according to the first embodiment of the present invention.

Next, FIG. 17 is a diagram illustrating an example of the hardware configuration of the client apparatus 2000 according to this embodiment. The client apparatus 2000 in this embodiment is configured as a computer apparatus connected to the IP network 1500.

A control unit 2005 controls the entirety of the client apparatus 2000. The control unit 2005 includes, for example, a CPU and executes programs stored in a storage unit 2006, which will be described later. Alternatively, the control unit 2005 may perform control using hardware. The storage unit 2006 is used as a region storing the programs executed by the control unit 2005, a work area during execution of the programs, and a region storing data.

Upon receiving an instruction from the control unit 2005, a communication unit 2004 transmits a command or the like to the monitoring camera 1000. In addition, upon receiving an instruction from the control unit 2005, the communication unit 2004 receives a response to a command, a streamed image, or the like from the monitoring camera 1000.

An input unit 2001 receives instructions from a user. For example, the input unit 2001 can receive instructions to transmit various commands to the monitoring camera 1000. In addition, the input unit 2001 can receive a response from the user to an inquiry message or the like generated for the user when the control unit 2005 has executed a program stored in the storage unit 2006.

A decoding decompression unit 2003 decodes and decompresses an image output from the communication unit 2004. The decoding decompression unit 2003 then outputs the decoded and decompressed image to a display unit 2002. The display unit 2002 displays the image output from the decoding decompression unit 2003. In addition, the display unit 2002 can display an inquiry message or the like for the user generated when the control unit 2005 has executed a program stored in the storage unit 2006.

Figure 3:
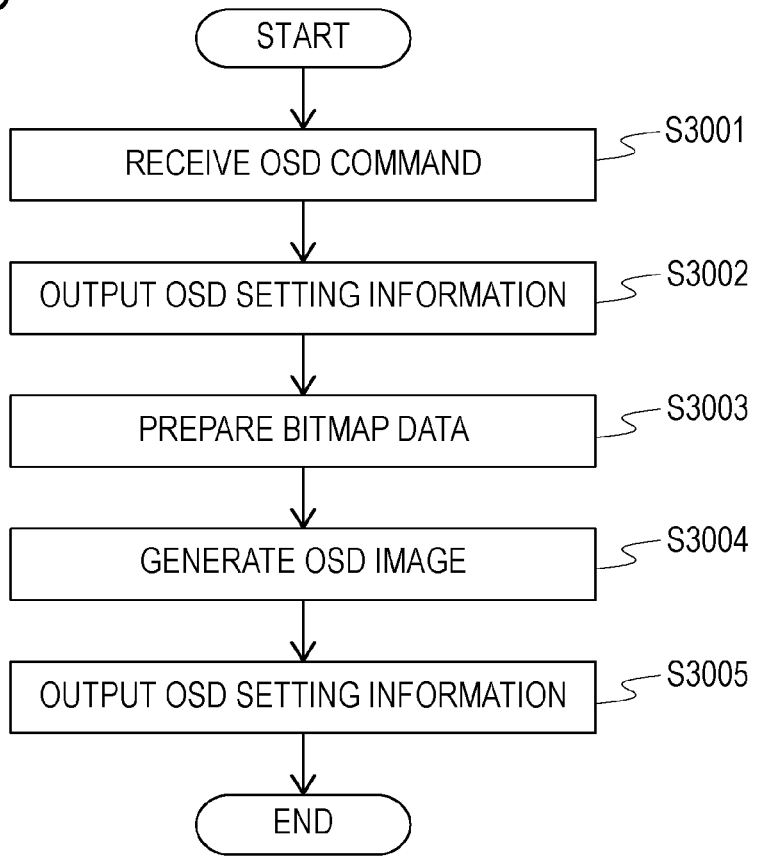
FIG. 3 is a diagram illustrating an example of a process for combining an OSD image with a captured image according to the first embodiment of the present invention.

Next, FIG. 3 is a flowchart illustrating an example of a process for combining an OSD image output from the OSD generation unit 1007 with a captured image output from the image capture unit 1002. The process illustrated in FIG. 3 is executed by the control unit 1008.

In step S3001, the control unit 1008 receives OSD setting commands transmitted from the client apparatus 2000 through the communication unit 1005. The control unit 1008 analyzes the OSD setting commands and generates OSD setting information.

In step S3002, the control unit 1008 outputs the OSD setting information generated in step S3001 to the OSD generation unit 1007. At the same time as this outputting, the control unit 1008 outputs image setting information set to the image processing unit 1003 to the OSD generation unit 1007. The image setting information includes information regarding an image size.

In step S3003, the control unit 1008 instructs the OSD generation unit 1007 to prepare bitmap data for the OSD image. The bitmap data is held by a memory provided inside the OSD generation unit 1007.

For example, if the OSD image is a text, the control unit 1008 instructs the OSD generation unit 1007 to read font data of different sizes from the storage unit 1009 and prepare a plurality of pieces of bitmap data corresponding to the image sizes of captured images. As a result of this process, the OSD image can be superimposed upon the captured image at a constant ratio independently of the size of the captured image.

In step S3004, the control unit 1008 instructs the OSD generation unit 1007 to generate the OSD image as bitmap data. The OSD image includes colors and the like specified by the OSD setting information generated in step S3001.

In step S3005, the control unit 1008 instructs the OSD generation unit 1007 to output OSD setting information to the compression coding unit 1004.

Here, the OSD setting information includes information for determining a position in the captured image output from the image processing unit 1003 at which the bitmap data is combined with the captured image. The combining position is obtained on the basis of superimposing position information regarding the OSD image specified by the OSD setting information received in step S3001 and the bitmap data generated in step S3004.

The compression coding unit 1004 combines the OSD image output from the OSD generation unit 1007 with the captured image output from the image processing unit 1003. At the time of the combining, the compression coding unit 1004 causes the size of the captured image or the resolution of the captured image to reflect the OSD image and the OSD setting information output from the OSD generation unit 1007.

The compression coding unit 1004 then performs compression coding on the captured image obtained as a result of the combining using a coding scheme specified by coding setting information output from the control unit 1008. As a result of this process, the captured image with which the OSD image has been combined is streamed to the client apparatus 2000 through the communication unit 1005.

The communication unit 1005 is an example of a delivery unit that delivers, through the IP network 1500, a captured image with which an OSD image has been combined by the compression coding unit 1004.

If an OSD image specified by OSD setting information includes information updated every second, such as a clock, the OSD generation unit 1007 causes the compression coding unit 1004 to reflect a new OSD image and new OSD setting information each time the information is updated.

Figure 4:
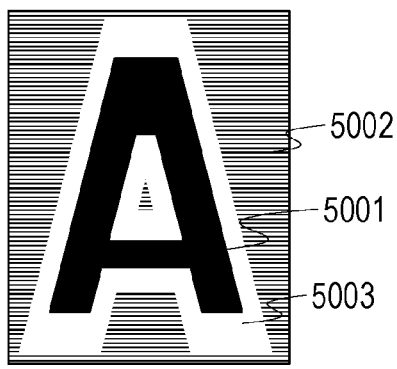
FIG. 4 is a diagram illustrating an example of font data used in a text included in an OSD image according to the first embodiment of the present invention.

Next, FIG. 4 is a diagram illustrating an example of font data used for a text included in an OSD image (in other words, FIG. 4 is a diagram illustrating an example of the configuration of bitmap data superimposed as an OSD image). This font data is stored in the storage unit 1009.

A data area 5001 illustrated in FIG. 4 indicates a font, which is a character included in the OSD image, that is, indicates a character such as an alphabet, a number, or a sign. A data area 5002 indicates the background of the character included in the OSD image. More specifically, the data area 5002 is the background formed by a rectangle surrounding the font 5001, which is the character included in the OSD image.

The color of the data area 5001 in this embodiment is an example of the foreground color of a character included in an OSD image.

A data area 5003 indicates the outline of the character included in the OSD image. More specifically, the data area 5003 is the outline of the font 5001, which is the character included in the OSD image, and indicates a boundary between the font 5001 and the background 5002.

The client apparatus 2000 in this embodiment can specify a color and transparency for each of the font 5001, the background 5002, and the outline 5003 illustrated in FIG. 4. Setting values for the font 5001, the background 5002, and the outline 5003 are set in the above-described OSD setting information.

Different colors (or different values of transparency) may be set for the font 5001, the background 5002, and the outline 5003, or the same color (or the same value of transparency) may be set. Furthermore, if the colors (or transparency) of the font 5001, the background 5002, and the outline 5003 have not been specified, a default setting is used for the color (or transparency) of each of the font 5001, the background 5002, and the outline 5003.

In addition, in this embodiment, if a plurality of OSD images are displayed in an image to be streamed, the same colors and values of transparency are applied to the font 5001, the background 5002, and the outline 5003 for each bitmap in OSD settings. The present invention, however, is not limited to such a configuration. For example, a configuration may be adopted in which individual settings can be specified for the OSD settings at each position.

Figure 5:
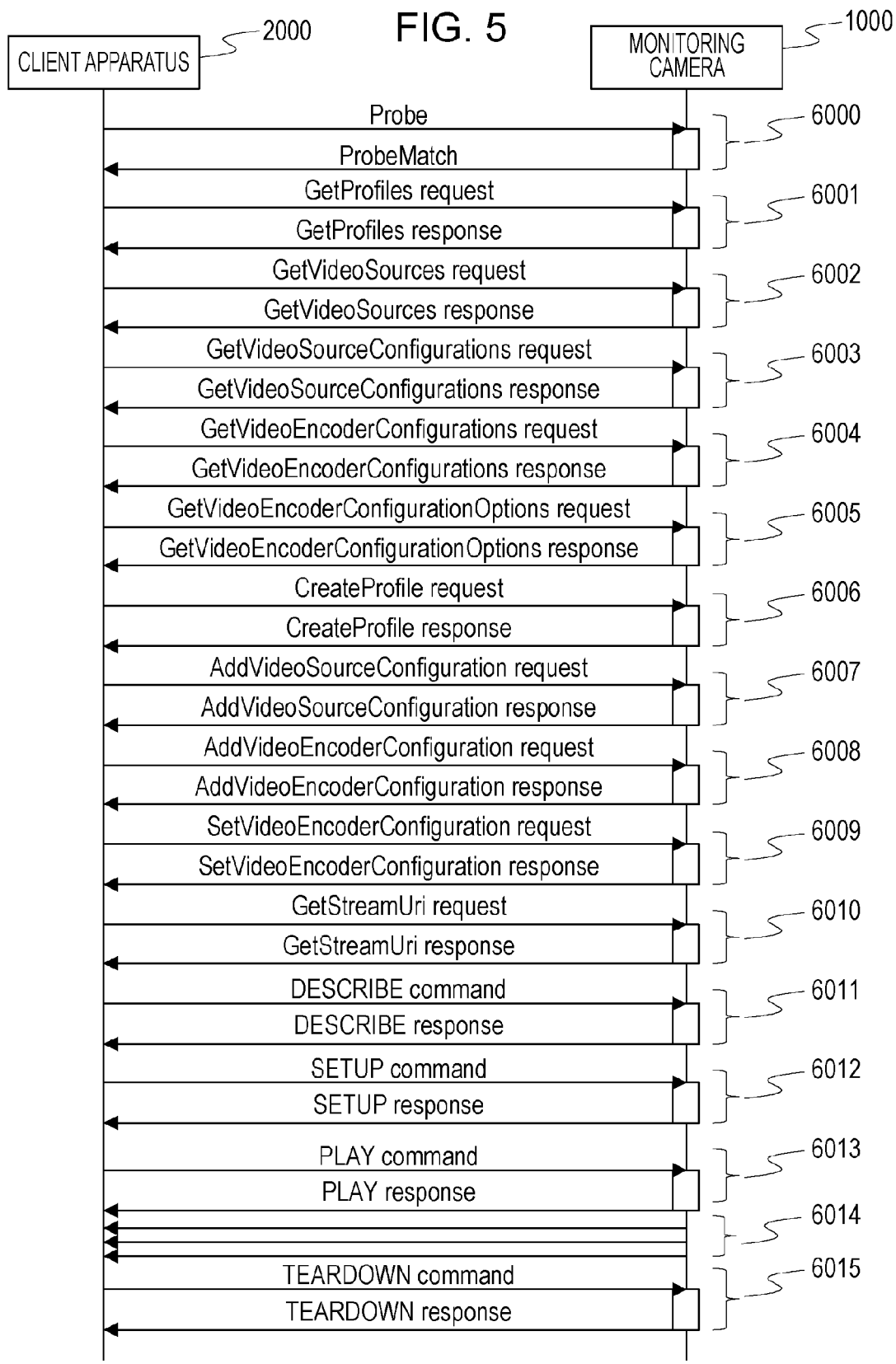
FIG. 5 is a sequence diagram illustrating a command sequence between the monitoring camera and a client apparatus according to the first embodiment of the present invention.

Next, FIG. 5 is a sequence diagram illustrating a typical command sequence between the monitoring camera 1000 and the client apparatus 2000 until an image is streamed after parameters of the image to be streamed are set.

A transaction in this embodiment refers to a combination of a command transmitted from the client apparatus 2000 to the monitoring camera 1000 and a response transmitted from the monitoring camera 1000 to the client apparatus 2000.

In a transaction 6000 illustrated in FIG. 5, an apparatus is searched for. The client apparatus 2000 multicasts Probe commands including certain search conditions for searching for a monitoring camera connected to a network. If a monitoring camera that has received the Probe command satisfies the search conditions, the monitoring camera transmits a ProbeMatch command to the client apparatus 2000, which has transmitted the Probe command. Thus, the search ends.

In a GetProfiles transaction 6001, media profiles, which correspond to delivery profiles, are obtained. The client apparatus 2000 transmits a GetProfiles command to the monitoring camera 1000.

Upon receiving the GetProfiles command, the monitoring camera 1000 transmits a list of media profiles to the client apparatus 2000. As a result, the client apparatus 2000 obtains the list of media profiles currently available in the monitoring camera 1000 as well as delivery profile identifiers (IDs) for identifying the media profiles.

In a GetVideoSources transaction 6002, the functions of the image processing unit 1003 are obtained. The client apparatus 2000 transmits a GetVideoSources command to the monitoring camera 1000. Upon receiving the GetVideoSources command, the monitoring camera 1000 transmits a response to the command to the client apparatus 2000.

As a result of this transaction, the client apparatus 2000 obtains setting information regarding image processing functions held by the monitoring camera 1000.

In a GetVideoSourceConfigurations transaction 6003, a list of image processing settings is obtained from the monitoring camera 1000. The client apparatus 2000 transmits a GetVideoSources command to the monitoring camera 1000.

Upon receiving the GetVideoSources command, the monitoring camera 1000 transmits a list of IDs of the image processing settings held thereby to the client apparatus 2000. The list is an example of image setting information generated by the control unit 1008.

In a GetVideoEncoderConfigurations transaction 6004, the functions of the compression coding unit 1004 are obtained. The client apparatus 2000 transmits a GetVideoEncoderConfigurations command to the monitoring camera 1000. Upon receiving the command, the monitoring camera 1000 transmits a response to the command.

As a result of this transaction, the client apparatus 2000 obtains information regarding the functions provided by the compression coding unit 1004 of the monitoring camera 1000. The information is an example of coding setting information generated by the control unit 1008.

In a GetVideoEncoderConfigurationOptions transaction 6005, a list of settings for the compression coding unit 1004 is obtained. The client apparatus 2000 transmits a GetVideoEncoderConfigurationOptions command to the monitoring camera 1000.

Upon receiving the command, the monitoring camera 1000 transmits a response to the command. As a result of this transaction, the client apparatus 2000 obtains a list including IDs of compression coding settings stored in the storage unit 1009.

In a CreateProfile transaction 6006, creation of a delivery profile is requested. The client apparatus 2000 transmits a CreateProfile command to the monitoring camera 1000. Upon receiving the command, the monitoring camera 1000 transmits a response to the command.

As a result of this transaction, the client apparatus 2000 can newly create the delivery profile in the monitoring camera 1000 and obtain an ID of the created delivery profile. The monitoring camera 1000 stores the newly created delivery profile.

In an AddVideoSourceConfiguration transaction 6007, addition of an image processing setting is requested. The client apparatus 2000 transmits an AddVideoSourceConfiguration command to the monitoring camera 1000.

Upon receiving the command, the monitoring camera 1000 transmits a response to the command to the client apparatus 2000. As a result of this transaction, the client apparatus 2000 specifies the ID of the delivery profile obtained in the CreateProfile transaction 6006 and the IDs of the image processing settings obtained in the GetVideoSourceConfigurations transaction 6003. The monitoring camera 1000 associates the specified image processing settings with the specified delivery profile and stores the image processing settings and the delivery profile.

The command used in the AddVideoSourceConfiguration transaction 6007 is an example of the above-described image setting command.

In an AddVideoEncoderConfiguration transaction 6008, addition of a compression coding setting is requested. The client apparatus 2000 transmits an AddVideoEncoderConfiguration command to the monitoring camera 1000. The monitoring camera 1000 transmits a response to the command to the client apparatus 2000.

As a result of this transaction, the client apparatus 2000 specifies the ID Of the delivery profile obtained in the CreateProfile transaction 6006 and the IDs of the compression coding settings obtained in the GetVideoEncoderConfigurationOptions transaction 6005 and associates the compression coding settings with the delivery profile. The monitoring camera 1000 associates the specified compression coding settings with the specified delivery profile and stores the compression coding settings and the delivery profile.

In a SetVideoEncoderConfiguration transaction 6009, the compression coding settings are changed. The client apparatus 2000 transmits a SetVideoEncoderConfiguration command to the monitoring camera 1000.

Upon receiving the command, the monitoring camera 1000 transmits a response to the command. As a result of the transaction, the client apparatus 2000 changes the compression coding settings obtained in the GetVideoEncoderConfigurations transaction 6004 on the basis of the options obtained in the GetVideoEncoderConfigurationOptions transaction 6005. For example, the compression coding scheme and a resultant size are changed. The monitoring camera 1000 stores the new compression coding settings.

The command used in the AddVideoEncoderConfiguration transaction 6008 and the command used in the SetVideoEncoderConfiguration transaction 6009 are examples of the above-described coding setting commands.

In a GetStreamUri transaction 6010, obtaining of a delivery address is requested. In this transaction, the client apparatus 2000 specifies the ID of the delivery profile obtained in the CreateProfile transaction 6006 and obtains the delivery address for obtaining an image to be delivered on the basis of the settings of the specified delivery profile.

The monitoring camera 1000 transmits the image processing settings associated with the specified profile ID and the delivery address for delivering the image corresponding to the compression coding settings to the client apparatus 2000.

In a DESCRIBE transaction 6011, obtaining of delivery information is requested. The client apparatus 2000 transmits a DESCRIBE command to the monitoring camera 1000. Upon receiving the command, the monitoring camera 1000 transmits a response to the command to the client apparatus 2000.

In this transaction, the client apparatus 2000 specifies the delivery address obtained in the GetStreamUri transaction 6010 and obtains detailed data regarding the delivery information of the monitoring camera 1000.

In a SETUP transaction 6012, delivery settings are requested. The client apparatus 2000 transmits a SETUP command to the monitoring camera 1000. Upon receiving the command, the monitoring camera 1000 transmits a response to the command to the client apparatus 2000.

As a result of the transaction, the client apparatus 2000 causes the monitoring camera 1000 to prepare for streaming on the basis of the detailed data regarding the delivery information obtained in the DESCRIBE transaction 6011. By executing the command, the client apparatus 2000 and the monitoring camera 1000 share a method for transmitting stream including a session number.

In a PLAY transaction 6013, the delivery is begun. The client apparatus 2000 transmits a PLAY command to the monitoring camera 1000. Upon receiving the command, the monitoring camera 1000 transmits a response to the command to the client apparatus 2000.

When transmitting the PLAY command to the monitoring camera 1000, the client apparatus 2000 uses the session number obtained in the SETUP transaction 6012 to begin the streaming of the image based on the settings of the delivery profile specified for the monitoring camera 1000.

Stream 6014 is delivered to the client apparatus 2000 from the monitoring camera 1000. The stream requested to begin in the PLAY transaction 6013 is delivered using the transmission method shared in the SETUP transaction 6012.

In a TEARDOWN transaction 6015, the delivery is stopped. The client apparatus 2000 transmits a TEARDOWN command to the monitoring camera 1000. Upon receiving the command, the monitoring camera 1000 transmits a response to the command.

In this transaction, the client apparatus 2000 specifies the session number obtained in the SETUP transaction 6012 and stops the streaming.

Figure 6:
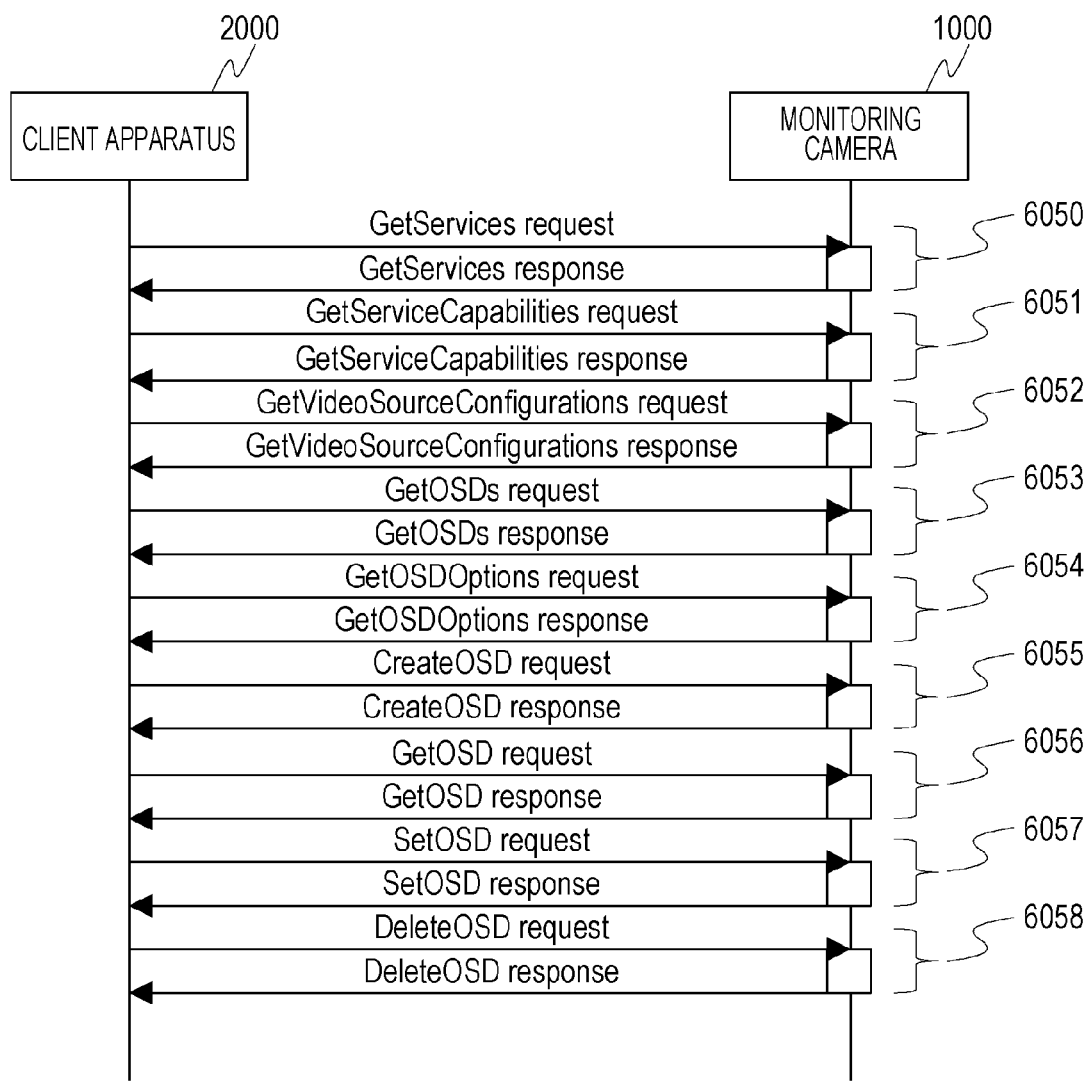
FIG. 6 is a sequence diagram illustrating a command sequence between the monitoring camera and the client apparatus according to the first embodiment of the present invention.

Next, FIG. 6 illustrates a typical command sequence between the monitoring camera 1000 and the client apparatus 2000 for setting a process for superimposing an image and the like.

In a GetServices transaction 6050 illustrated in FIG. 6, obtaining of the functions of the monitoring camera 1000 is requested. The client apparatus 2000 transmits a GetServices command to the monitoring camera 1000. Upon receiving the command, the monitoring camera 1000 transmits a response to the command.

As a result of the transaction, the client apparatus 2000 obtains a list of the functions of the monitoring camera 1000. The client apparatus 2000 checks whether the monitoring camera 1000 has an image processing function and a compression coding function.

In a GetServiceCapabilities transaction 6051, obtaining of functions corresponding to the process for superimposing an image is requested. The client apparatus 2000 transmits a GetServiceCapabilities command to the monitoring camera 1000. Upon receiving the command, the monitoring camera 1000 transmits a response to the command.

In this transaction, the client apparatus 2000 checks whether the monitoring camera 1000 can perform the process for superimposing an image. For example, the control unit 2005 receives superimposing possibility information, which indicates whether the monitoring camera 1000 can perform the process for superimposing an image, from the monitoring camera 1000 through the communication unit 2004.

In a GetVideoSourceConfigurations transaction 6052, a list of the image processing settings is obtained. The client apparatus 2000 transmits a GetVideoSourceConfigurations command to the monitoring camera 1000.

Upon receiving the command, the monitoring camera 1000 transmits a response to the command to the client apparatus 2000. As a result of this transaction, the client apparatus 2000 obtains a list including the IDs of the image processing settings held by the monitoring camera 1000 from the monitoring camera 1000. The list is an example of the image setting information generated by the control unit 1008.

In a GetOSDs transaction 6053, obtaining of an image superimposing setting list is requested. The client apparatus 2000 transmits a GetOSDs command to the monitoring camera 1000. Upon receiving the command, the monitoring camera 1000 transmits a response to the command to the client apparatus 2000.

In this transaction, the client apparatus 2000 specifies the IDs of the image processing settings obtained in the GetVideoSourceConfigurations transaction 6052. As a result, the client apparatus 2000 obtains a list of all image superimposing settings including OSD tokens, which are IDs of the image superimposing settings associated with the image processing settings held by the monitoring camera 1000.

In a GetOSDOptions transaction 6054, options of the image superimposing settings are obtained. The client apparatus 2000 transmits a GetOSDOptions command to the monitoring camera 1000. Upon receiving the command, the monitoring camera 1000 transmits a response to the command to the client apparatus 2000.

In this transaction, the client apparatus 2000 specifies the IDs of the image processing settings obtained in the GetVideoSourceConfigurations transaction 6052. As a result, the client apparatus 2000 obtains settable options and the range of setting values for each parameter of the image superimposing settings associated with the image processing settings held by the monitoring camera 1000.

In a CreateOSD transaction 6055, an image superimposing setting is created. The client apparatus 2000 transmits a CreateOSD command to the monitoring camera 1000. Upon receiving the command, the monitoring camera 1000 transmits a response to the command to the client apparatus 2000.

As a result of this transaction, the client apparatus 2000 can create a new image superimposing setting in the monitoring camera 1000 on the basis of the options obtained in the GetOSDOptions transaction 6054. The monitoring camera 1000 returns an OSD token, which is the ID of an image superimposing setting, in accordance with the image superimposing setting specified by the client apparatus 2000.

In a GetOSD transaction 6056, obtaining of an image superimposing setting is requested. The client apparatus 2000 transmits a GetOSD command to the monitoring camera 1000. Upon receiving the command, the monitoring camera 1000 transmits a response to the command to the client apparatus 2000.

In this transaction, the client apparatus 2000 obtains the image superimposing setting using the OSD token, which is the ID of an image superimposing setting, obtained in the CreateOSD transaction 6055. The response used in the GetOSDs transaction 6053 and the response used in the GetOSD transaction 6056 are examples of the OSD setting information generated by the control unit 1008.

In a SetOSD transaction 6057, the image superimposing settings are changed. The client apparatus 2000 transmits a SetOSD command to the monitoring camera 1000. Upon receiving the command, the monitoring camera 1000 transmits a response to the command to the client apparatus 2000.

In this transaction, the client apparatus 2000 specifies an OSD token, which is the ID of an image superimposing setting. As a result, he client apparatus 2000 can change the image superimposing setting obtained in the GetOSD transaction 6056 or the image superimposing setting newly created in the CreateOSD transaction 6055 on the basis of the options obtained in the GetOSDOptions transaction 6054. For example, the client apparatus 2000 changes the superimposing position or the text to be superimposed.

The response used in the SetOSD transaction 6057 does not include an OSD token. The command used in the CreateOSD transaction 6055 and the command used in the SetOSD transaction 6057 are examples of the above-described OSD setting command.

In a DeleteOSD transaction 6058, an image superimposing setting is deleted. The client apparatus 2000 transmits a DeleteOSD command to the monitoring camera 1000. Upon receiving the command, the monitoring camera 1000 transmits a response to the command to the client apparatus 2000.

As a result of this transaction, the client apparatus 2000 deletes the image superimposing setting obtained in the GetOSDs transaction 6053 or the GetOSD transaction 6056 or the image superimposing setting newly created in the CreateOSD transaction 6055 from the monitoring camera 1000. The monitoring camera 1000 deletes an image superimposing setting having an OSD token corresponding to the specified image superimposing setting ID.

FIGS. 7A to 7G are diagrams illustrating the configurations of OSDConfiguration, which is a data type according to this embodiment. Data types illustrated in FIGS. 7A to 7G are, for example, defined using an Extensible Markup Language (XML) schema definition language (hereinafter also referred to as XSD).

FIG. 7A is a diagram illustrating an example of a definition of an OSDConfiguration type. As illustrated in FIG. 7A, the OSDConfiguration type is defined as a complex type by a complexType declaration in XML. A complexContent element, an extension element, and a base attribute of the extension element indicate that the OSDConfiguration type is an extension type obtained by extending a DeviceEntity type.

A sequence element indicates that in the OSDConfiguration type, data extension in which a sequence occurs in accordance with the definition is performed.

FIG. 7B is a diagram illustrating an example of a definition of an OSDReference type. A simpleContent element, an extension element, and a base attribute of the extension element indicate that data of the OSDReference type is an extension type obtained by extending a ReferenceToken type.

FIG. 7C is a diagram illustrating an example of a definition of an OSDType type. In the example of the definition of the OSDType type, a simpleType element indicates that the OSDType type is a simple type in XML, and a restriction element and a base attribute of the restriction element indicate that the OSDType type is a value restriction type of a string type. In the example illustrated in FIG. 7C, it is indicated that the OSDType type has a value of Text, Image, or Extended.

FIG. 7D is a diagram illustrating an example of a definition of an OSDPosConfiguration type. In the example of the definition of the OSDPosConfiguration type, a complexType element indicates that the OSDPosConfiguration type is defined as a complex type. In addition, a sequence element indicates that the OSDPosConfiguration type is a data type in which a sequence occurs in accordance with the definition.

FIG. 7E is a diagram illustrating an example of a definition of an OSDTextConfiguration type. In the example of the definition of the OSDTextConfiguration type, a complexType element indicates that the OSDTextConfiguration type is defined as a complex type. In addition, a sequence element indicates that the OSDTextConfiguration type is a data type in which a sequence occurs in accordance with the definition.

FIG. 7F is a diagram illustrating an example of a definition of an OSDImgConfiguration type. In the example of the definition of the OSDImgConfiguration type, a complexType element indicates that the OSDImgConfiguration type is defined as a complex type. In addition, a sequence element indicates that the OSDImgConfiguration element is a data type in which a sequence occurs in accordance with the definition.

FIG. 7G is a diagram illustrating an example of the definition of an OSDConfigurationExtension type. In the example of the definition of the OSDConfigurationExtension type, a complexType element indicates that the OSDConfigurationExtension type is defined as a complex type. In addition, a sequence element indicates that the OSDConfigurationExtension type is a data type in which a sequence occurs in accordance with the definition.

Next, FIGS. 8A to 8E and FIGS. 9A to 9F are diagrams illustrating the configurations of an OSDConfigurationOptions type, which is a data type according to this embodiment. As with the data types illustrated in FIGS. 7A to 7G, data types illustrated in FIGS. 8A to 8E and FIGS. 9A to 9F are defined using the XSD.

FIG. 8A is a diagram illustrating an example of a definition of an OSDConfigurationOptions type. A complexType element indicates that the OSDConfigurationOptions type is defined as a complex type. In addition, a sequence element indicates that the OSDConfigurationOptions type is a data type in which a sequence occurs in accordance with the definition.

In the OSDConfigurationOptions type, a first field is MaximumNumberOfOSDs of an int type. A next field is Type of an OSDType type. A next field is PositionOption of a string type. A next field is TextOption of an OSDTextOptions type.

Furthermore, a next field is ImageOption of an OSDImageOptions type. A last field is Extension of an OSDConfigurationOptionsExtension type.

maxOccurs="unbounded" specifiers in the Type and PositionOption fields indicate that a plurality of Type fields and a plurality of PositionOption fields can exist in the OSDConfigurationOptions type. In addition, minOccurs="0" specifiers in the TextOption, ImageOption, and Extension field indicate that the TextOption, ImageOption, and Extension fields can be omitted.

FIG. 8B is a diagram illustrating an example of a definition of an OSDTextOptions type. A complexType element indicates that the OSDTextOptions type is defined as a complex type. In addition, a sequence element indicates that the OSDTextOptions is a data type in which a sequence occurs in accordance with the definition.

In the OSDTextOptions type, a first field is a Type field of a string type. A next field is a FontSizeRange type of an IntRange type. A next field is a DateFormat field of a string type. A next field is a TimeFormat field of, as with the DateFormat field, a string type. A next field is a FontColor field of an OSDColorOptions type.

A next field is a BackgroundColor field of, as with the FontColor field, of an OSDColorOptions type. A last field is an Extension field of an OSDTextOptionsExtension type.

maxOccurs="unbounded" specifiers in the Type field, the DateFormat field, and the TimeFormat field indicate that a plurality of Type fields, a plurality of DateFormat fields, and a plurality of TimeFormat fields can exist in the OSDTextOptions type.

In addition, minOccurs="0" specifiers in the FontSizeRange field, the DateFormat field, the TimeFormat field, and the FontColor field indicate that the FontSizeRange field, the DateFormat field, the TimeFormat field, and the FontColor field can be omitted. Similarly, minOccurs="0" specifiers in the BackgroundColor field and the Extension field indicate that the BackgroundColor field and the Extension field can be omitted.

FIG. 8C is a diagram illustrating an example of a definition of an OSDImgOptions type. A complexType element indicates that the OSDImgOptions type is defined as a complex type. In addition, a sequence element indicates that the OSDImgOptions type is a data type in which a sequence occurs in accordance with the definition.

In the OSDImgOptions type, a first field is an ImagePath field of an anyURI type. A next field is an Extension field of an OSDImgOptionsExtension type. A maxOccurs="unbounded" specifier in the ImagePath field indicates that a plurality of ImagePath fields can exist in the OSDImgOptions type.

A minOccurs="0" specifier in the Extension field indicates that the Extension field can be omitted.

FIG. 8D is a diagram illustrating an example of a definition of an OSDConfigurationOptionsExtension type. A complexType element indicates that the OSDConfigurationOptionsExtension type is defined as a complex type. In addition, a sequence element indicates that the OSDConfigurationOptionsExtension type is a data type in which a sequence occurs in accordance with the definition.

FIG. 8E is a diagram illustrating an example of a definition of an IntRange type. A complexType element indicates that the IntRange type is defined as a complex type. In addition, a sequence element indicates that the IntRange type is a data type in which a sequence occurs in accordance with the definition.

In the IntRange type, a first field is a Min field of an int type, and a last field is a Max field of an int type.

FIG. 9A is a diagram illustrating an example of a definition of an OSDColorOptions type. A complexType element indicates that the OSDColorOptions type is defined as a complex type. In addition, a sequence element indicates that the OSDColorOptions type is a data type in which a sequence occurs in accordance with the definition.

minOccurs="0" specifiers in a Color field, a Transparent field, and an Extension field indicate that the Color field, the Transparent field, and the Extension field can be omitted.

FIG. 9B is a diagram illustrating an example of a definition of an OSDTextOptionsExtension type. A complexType element indicates that the OSDTextOptionsExtension type is defined as a complex type. In addition, a sequence element indicates that the OSDTextOptionsExtension type is a data type in which a sequence occurs in accordance with the definition.

FIG. 9C is a diagram illustrating an example of a definition of a ColorOptions type. A complexType element indicates that the ColorOptions type is defined as a complex type. In addition, a sequence element indicates that the ColorOptions type is a data type in which a sequence occurs in accordance with the definition. In addition, a choice element in the sequence element indicates that one of elements in the choice element is selected.

More specifically, in the ColorOptions type, either a ColorList field or a ColorspaceRange field, which will be described later, is selected. As described above, one of the options in the ColorOptions type is the ColorList field. The other option is the ColorspaceRange field of a ColorspaceRange type.

maxOccurs="unbounded" identifiers in the ColorList field and the ColorspaceRange field indicate that a plurality of ColorList fields and a plurality of ColorspaceRange fields can exist.

FIG. 9D is a diagram illustrating an example of a definition of a Color type. In the Color type, attributes X, Y, and Z of a float type can be described using attribute elements. In addition, use="required" specifiers in the attributes X, Y, and Z indicate that the attributes X, Y, and Z are mandatory configurations in the Color type.

In the Color type, an attribute Colorspace of an anyURI type can be described using an attribute element.

FIG. 9E is a diagram illustrating an example of a definition of a ColorspaceRange type. A complexType element indicates that the ColorspaceRange type is defined as a complex type. In addition, a sequence element indicates that the ColorspaceRange type is a data type in which a sequence occurs in accordance with the definition.

In the ColorspaceRange type, a first field is an X field, a next field is a Y field, and a third field is a Z field. The X field, the Y field, and the Z field are data of a FloatRange type. A last field in the ColorspaceRange type is a Colorspace field of an anyURI type.

FIG. 9F is a diagram illustrating an example of a definition of a FloatRange type. In the definition of the FloatRange type, a complexType element indicates that the FloatRange type is defined as a complex type. In addition, a sequence element indicates that the FloatRange type is a data type in which a sequence occurs in accordance with the definition.

In the FloatRange type, a first field is a Min field of a float type, and a last field is a Max field of a float type. In this embodiment, the client apparatus 2000 obtains information regarding OSD that can be set to the image capture apparatus according to this embodiment from the image capture apparatus using data of the OSDConfigurationOptions type. The data is an example of the response used in the GetOSDOptions transaction 6054.

In addition, the monitoring camera 1000 in this embodiment uses data of the OSDConfigurationOptions type to transmit information regarding the capabilities of the monitoring camera 1000 concerning OSD. The data is an example of the response used in the GetOSDOptions transaction 6054.

Figure 10:
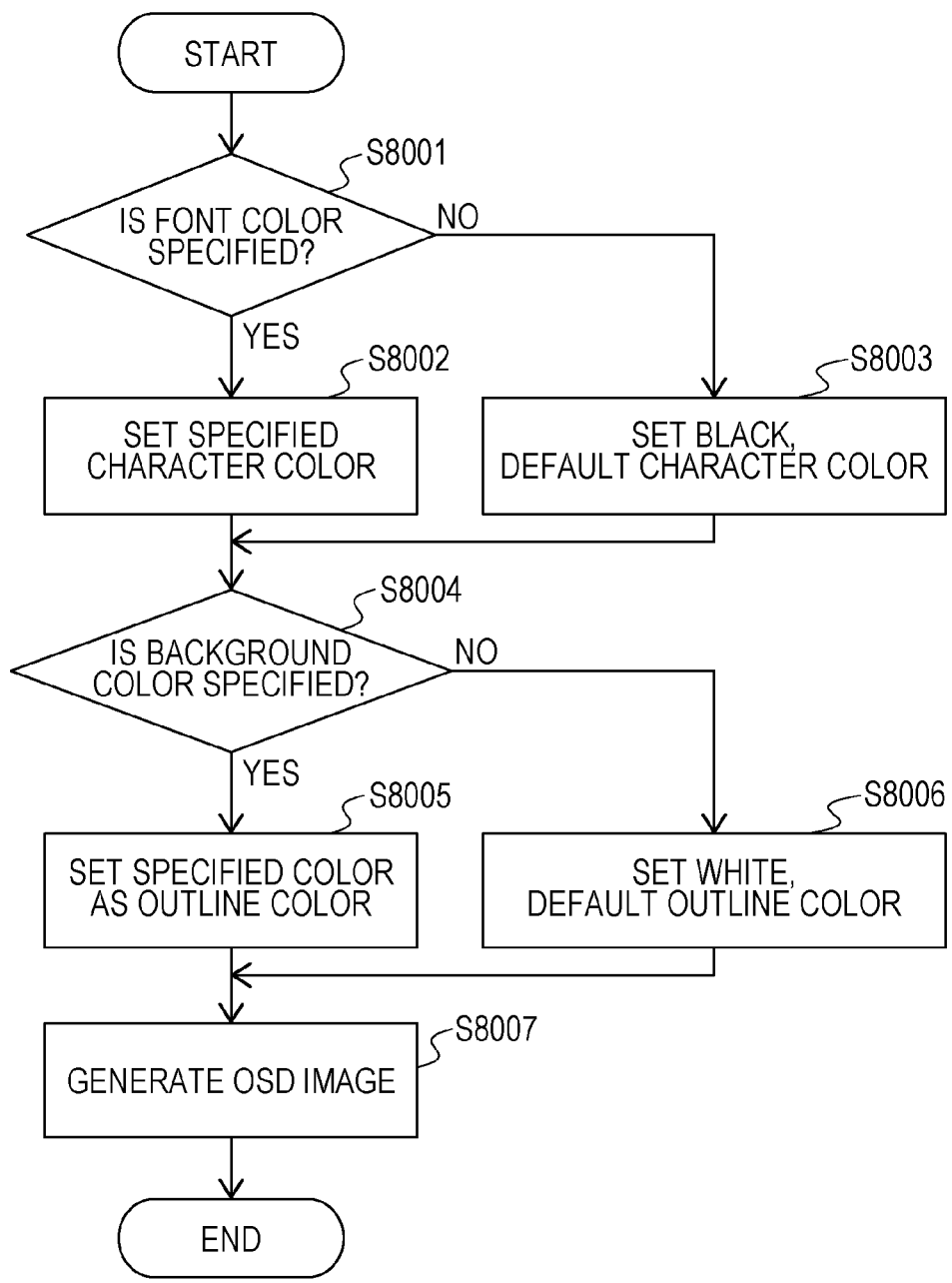
FIG. 10 is a flowchart illustrating an example of a process for generating an OSD image on the basis of a SetOSD command received by the monitoring camera according to the first embodiment of the present invention.

Next, FIG. 10 is a flowchart illustrating an example of a process for generating an OSD image on the basis of a SetOSD command received by the monitoring camera 1000 according to this embodiment. This process is executed by the control unit 1008. In addition, this process is begun by the control unit 1008 when the monitoring camera 1000 has received the SetOSD command.

As described above, the SetOSD command is a command for changing the image superimposing setting.

In step S8001, the control unit 1008 determines whether a font color is specified by the SetOSD command received by the communication unit 1005. For example, if a Color field associated with the FontColor field is described in the SetOSD command received by the communication unit 1005, the control unit 1008 determines that the font color is specified.

On the other hand, if a Color field associated with the FontColor field is not described in the SetOSD command received by the communication unit 1005, the control unit 1008 determines that the font color is not specified.

If the control unit 1008 has determined that the font color is specified by the SetOSD command received by the communication unit 1005, the control unit 1008 causes the process to proceed to S8002. On the other hand, if the control unit 1008 has determined that the font color is not specified by the SetOSD command received by the communication unit 1005, the control unit 1008 causes the process to proceed to step S8003.

In step S8002, the control unit 1008 sets a color corresponding to the Color field associated with the FontColor field subjected to the determination in step S8001 as the color of characters included in the OSD image.

In step S8003, the control unit 1008 sets black, which is a default color of the FontColor field, as the color of characters included in the OSD image.

In step S8004, the control unit 1008 determines whether a background color is specified by the SetOSD command received by the communication unit 1005. For example, if a Color field associated with the BackgroundColor field is described in the SetOSD command received by the communication unit 1005, the control unit 1008 determines that the background color is specified.

On the other hand, if a Color field associated with the BackgroundColor field is not described in the SetOSD command received by the communication unit 1005, the control unit 1008 determines that the background color is not specified.

If the control unit 1008 has determined that the background color is specified by the SetOSD command received by the communication unit 1005, the control unit 1008 causes the process to proceed to step S8005. On the other hand, if the control unit 1008 has determined that the background color is not specified by the SetOSD command received by the communication unit 1005, the control unit 1008 causes the process to proceed to S8006.

In step S8005, the control unit 1008 sets a color corresponding to the Color field associated with the BackgroundColor field subjected to the determination in step S8004 as the color of an outline (outline color) of the character included in the OSD image.

The font color and the background color in this embodiment are examples of color information indicating colors relating to a character included in an OSD image.

In step S8006, the control unit 1008 sets white, which is a default color of the BackgroundColor field, as the color of an outline of the characters included in the OSD image.

In step S8007, the control unit 1008 instructs the OSD generation unit 1007 to generate the OSD image.

If step S8002 has been executed after step S8001, the color of the characters included in the OSD image is the color corresponding to the Color field associated with the FontColor field subjected to the determination in step S8001. On the other hand, if step S8003 has been executed after step S8001, the color of the characters included in the OSD image is black, which has been determined in step S8003.

If step S8005 has been executed after step S8004, the color of the outlines included in the OSD image is the color corresponding to the Color field associated with the BackgroundColor field subjected to the determination in step S8004. On the other hand, if the processing in step S8006 has been executed after step S8004, the color of the outlines included in the OSD image is white, which has been determined in step S8006.

Figure 11A:
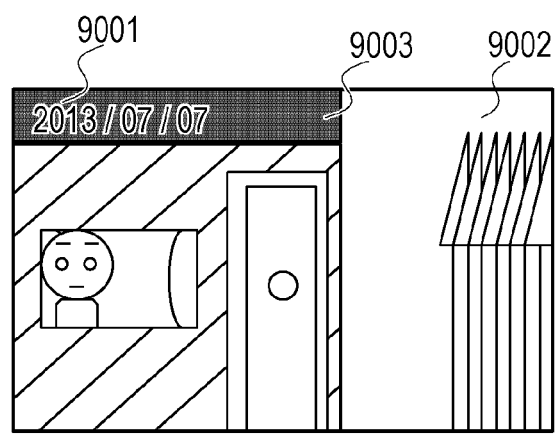
FIGS. 11A and 11B are diagrams illustrating an example of an image obtained by combining an OSD image with a captured image according to the first embodiment of the present invention.

Next, FIG. 11A is a diagram illustrating an example of an image (streaming image) obtained by combining an OSD image output from the OSD generation unit 1007 with a captured image output from the image processing unit 1003. The OSD image has been generated in accordance with the process described with reference to the flowchart of FIG. 10.

First, FIG. 11A illustrates an example of the image with which the OSD image has been combined on the basis of a SetOSD command received by the communication unit 1005. Here, the SetOSD command is a SetOSD command illustrated in FIG. 12, which will be referred to later.

FIG. 11A illustrates an OSD image 9001, a subject image 9002, and a roof 9003 in the subject image 9002.

Figure 11B:
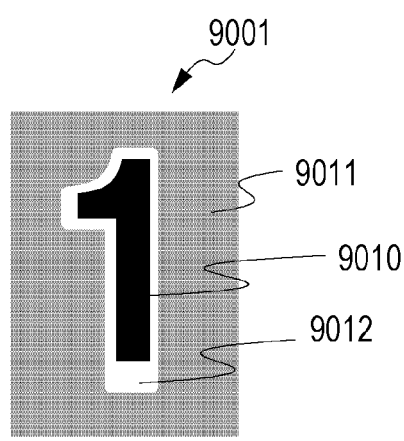

FIG. 11B is a diagram illustrating the OSD image 9001 in detail. In FIG. 11B, a character portion 9010 is included in the OSD image 9001. The color of the character portion 9010 is black, which is the default color of the FontColor field.

In addition, a non-OSD image portion 9011 is illustrated. In the non-OSD image portion 9011, the roof 9003 in the subject image 9002 is displayed. In addition, an outline portion 9012 included in the OSD image 9001 is also illustrated. The color of the outline portion 9012 is white, which is the default color of the BackgroundColor field.

Next, FIG. 12 is a diagram illustrating an example of a SetOSD request for changing the image superimposing setting. The request illustrated in FIG. 12 is an example of the SetOSD command used in the SetOSD transaction 6057.

In FIG. 12, the value of an OSD token, which is an ID for identifying the image superimposing setting of the OSD image, is "osd-1". VideoSourceConfigurationToken associated with the OSD token is an ID for identifying the image processing setting. The value of the ID is "0".

In addition, Type of an OSDType type is associated with the OSD token. The value of Type is "Text", which indicates that the OSD image includes a character string. Furthermore, Position for indicating a position at which the OSD image is superimposed is associated with the OSD token. The value of Type associated with Position is "UpperLeft", which indicates that the position at which the OSD image is superimposed is the upper left.

Furthermore, TextString for indicating setting information regarding the character string included in the OSD image is associated with the OSD token. Type for indicating the type of display of the OSD image is associated with TextString, and the value of Type is "Date", which indicates that the OSD image is a character string corresponding to a date.

In the SetOSD request illustrated in FIG. 12, a format of display of the date is omitted. When the format of display of the date is omitted, the date included in the OSD image is displayed in a format of yyyy/MM/dd (that is, the year, the month, and the day divided by slashes are arranged in this order).

In addition, in the SetOSD request illustrated in FIG. 12, the FontColor field is omitted. Therefore, the color of characters included in the OSD image generated on the basis of the SetOSD request illustrated in FIG. 12 becomes black, which is the default color of the FontColor field.

In addition, in the SetOSD request illustrated in FIG. 12, the BackgroundColor field is omitted. Therefore, the color of outlines of the characters included in the OSD image generated on the basis of the SetOSD request illustrated in FIG. 12 becomes white, which is the default color of the BackgroundColor field.

Thus, the monitoring camera 1000 in this embodiment can automatically set the color of the outlines of characters included in an OSD image in accordance with a background color specified by the SetOSD command.

For this reason, although there has been no command (interface) for specifying the color of outlines of characters included in an OSD image, it becomes possible to automatically set the color of the outlines of the characters included in the OSD image without providing such a command. As a result, a difference between the characters included in the OSD image and a background image of the characters becomes evident, thereby improving the visibility of the OSD image.

In step S8001 in this embodiment, the control unit 1008 is configured to determine, in the following case, that the font color is specified. That is, it is the case where a Color field associated with the FontColor field is described in the SetOSD command received by the communication unit 1005.

Furthermore, in step S8001 in this embodiment, the control unit 1008 is configured to determine, in the following case, that the font color is not specified. That is, it is the case where a Color field associated with the FontColor field is not described in the SetOSD command received by the communication unit 1005. The present invention, however, is not limited to these configurations.

For example, in step S8001, the control unit 1008 may be configured to determine, if the FontColor field is described in the SetOSD command received by the communication unit 1005, that the font color is specified.

Furthermore, in step S8001, the control unit 1008 may be configured to determine, if the FontColor field is not described in the SetOSD command received by the communication unit 1005, that the font color is not specified.

In addition, in step S8004 in this embodiment, the control unit 1008 is configured to determine, in the following case, that the background color is specified. That is, it is the case where a Color field associated with the BackgroundColor field is described in the SetOSD command received by the communication unit 1005.

Furthermore, in step S8004 in this embodiment, the control unit 1008 is configured to determine, in the following case, that the background color is not specified. That is, it is the case where a Color field associated with the BackgroundColor field is not described in the SetOSD command received by the communication unit 1005. The present invention, however, is not limited to these configurations.

For example, in step S8004, the control unit 1008 may be configured to determine, if the BackgroundColor field is described in the SetOSD command received by the communication unit 1005, that the background color is specified.

Furthermore, in step S8004, the control unit 1008 may be configured to determine, if the BackgroundColor field is not described in the SetOSD command received by the communication unit 1005, that the background color is not specified.

In addition, the SetOSD command for generating the OSD image illustrated in FIG. 11A is not limited to the SetOSD command illustrated in FIG. 12, from which the FontColor field and the BackgroundColor field are omitted.

For example, a SetOSD command in which the FontColor field associated with a Color field corresponding to black is described may be used. Furthermore, a SetOSD command in which the BackgroundColor field associated with a Color field corresponding to white is described may be used.

Second Embodiment

Next, a monitoring camera 1000 according to a second embodiment of the present invention will be described with reference to FIG. 13. The same components as those according to the above-described embodiment are given the same reference numerals, and accordingly description thereof is omitted.

In the first embodiment, the monitoring camera 1000 capable of automatically setting the color of the outlines of characters included in an OSD image in accordance with the background color specified by the SetOSD command has been described. On the other hand, in the second embodiment, a monitoring camera 1000 capable of automatically setting the color of the outlines of characters included in an OSD image even if the background color is omitted from the SetOSD command will be described.

Therefore, when the client apparatus 2000 makes settings for an OSD image, the monitoring camera 1000 can dynamically provide an effective OSD image even if the client apparatus 2000 has made only necessary settings. As a result, the same effect as those according to the first embodiment can be produced. The second embodiment, which takes into consideration the above point, will be described hereinafter.

Next, FIG. 13 is a flowchart illustrating an example of a process for generating an OSD image on the basis of a SetOSD command received by the monitoring camera 1000 according to this embodiment. This process will be executed by the control unit 1008. In addition, this process is begun by the control unit 1008 when the monitoring camera 1000 has received the SetOSD command.

Steps S8101 to S8103 illustrated in FIG. 13 are the same as the above-described steps S8001 to S8003, respectively, and accordingly description thereof is omitted.

In step S8104, the control unit 1008 sets the color of outlines of characters included in the OSD image in accordance with the color of the characters.

More specifically, first, the control unit 1008 determines whether the color of the characters included in the OSD image is white. Next, if the control unit 1008 has determined that the color of the characters included in the OSD image is white, the control unit 1008 sets the color of the outlines of the characters included in the OSD image to black. On the other hand, if the control unit 1008 has determined that the color of the characters included in the OSD image is not white, the control unit 1008 sets the color of the outlines of the characters included in the OSD image to white, which is the default outline color.

Although the default outline color of the characters included in the OSD image is only white, the default outline color is not limited to this. For example, when the OSD generation unit 1007 can change displayable colors of the OSD image stepwise, the control unit 1008 may be configured to change the color of edges of the characters included in the OSD image stepwise to smoothly connect to the outline color of the characters. As a result, the characters included in the OSD image can be displayed more smoothly.

Step S8105 is the same as the above-described step S8004, and accordingly description thereof is omitted.

In step S8106, the control unit 1008 sets the color corresponding to the Color field associated with the BackgroundColor field subjected to the determination in step S8105 as the color of the background of the characters included in the OSD image.

In step S8107, the control unit 1008 makes the background of the characters included in the OSD image transparent, which is the default setting. More specifically, the control unit 1008 does not superimpose the background of the characters included in the OSD image upon the captured image output from the image processing unit 1003.

In step S8108, the control unit 1008 instructs the OSD generation unit 1007 to generate the OSD image.

The color of the characters included in the OSD image is a color corresponding to the Color field associated with the FontColor field subjected to the determination in step S8101. On the other hand, if step S8103 has been executed after step S8101, the color of the characters included in the OSD image is black, which has been set in step S8103.

In addition, the color of the outlines of the characters included in the OSD image is the outline color set in step S8104.

If step S8106 has been executed after step S8105, the color of the background of the OSD image is a color corresponding to the Color field associated with the BackgroundColor field subjected to the determination in step S8105. On the other hand, if step S8107 has been executed after step S8105, the background of the OSD image is transparent.

Thus, the monitoring camera 1000 according to this embodiment can set the color of characters included in an OSD image by specifying a font color using a SetOSD command, and can dynamically set the outline color of the characters appropriately in accordance with the set color of the characters.

For this reason, although there has been no command (interface) for specifying the color of outlines of characters included in an OSD image, it becomes possible to automatically set the color of the outlines of the characters included in the OSD image without providing such a command. As a result, a difference between the characters included in the OSD image and a background image of the characters becomes evident, thereby improving the visibility of the OSD image.

Although the control unit 1008 is configured to set, if it is determined in step S8104 that the color of the characters included in the OSD image is white, the outline color of the characters included in the OSD image to black in this embodiment, the configuration of the control unit 1008 is not limited to this.

For example, the control unit 1008 may be configured to determine, in step S8104, whether the color of the characters included in the OSD image is a whitish color. Furthermore, the control unit 1008 may be configured to set, if the control unit 1008 has determined in step S8104 that the color of the characters included in the OSD image is a whitish color, the outline color of the characters included in the OSD image to black, with which the whitish characters stand out.

On the other hand, the control unit 1008 may be configured to set, if the control unit 1008 has determined in step S8104 that the color of the characters included in the OSD image is not a whitish color, the outline color of the characters included in the OSD image to white.

In addition, for example, the control unit 1008 may be configured to identify, in step S8104, the color of the characters included in the OSD image and set the complementary color of the identified color as the outline color of the characters included in the OSD image.

As a result, the characters included in the OSD image can stand out appropriately in accordance with the color of the characters included in the OSD image.

Third Embodiment

Next, a monitoring camera 1000 according to a third embodiment of the present invention will be described with reference to FIG. 14. The same components as those according to the above-described embodiments are given the same reference numerals, and accordingly description thereof is omitted.

In the second embodiment, the monitoring camera 1000 that dynamically changes the outline color of characters included in an OSD image streamed to the client apparatus 2000 in accordance with a setting value (color of the characters) of the OSD image has been described.

On the other hand, in the third embodiment, a monitoring camera 1000 capable of automatically setting the outline color of characters included in an OSD image in accordance with both the font color and the background color specified by the SetOSD command will be described.

Therefore, the monitoring camera 1000 can dynamically provide an effective OSD image even if the client apparatus 2000 has made only necessary settings (for example, even if the client apparatus 2000 omits specification of the font color or the background color from the SetOSD command). As a result, the same effects as those according to the first and second embodiments can be produced. The third embodiment, which takes into consideration the above point, will be described hereinafter.

Figure 14:
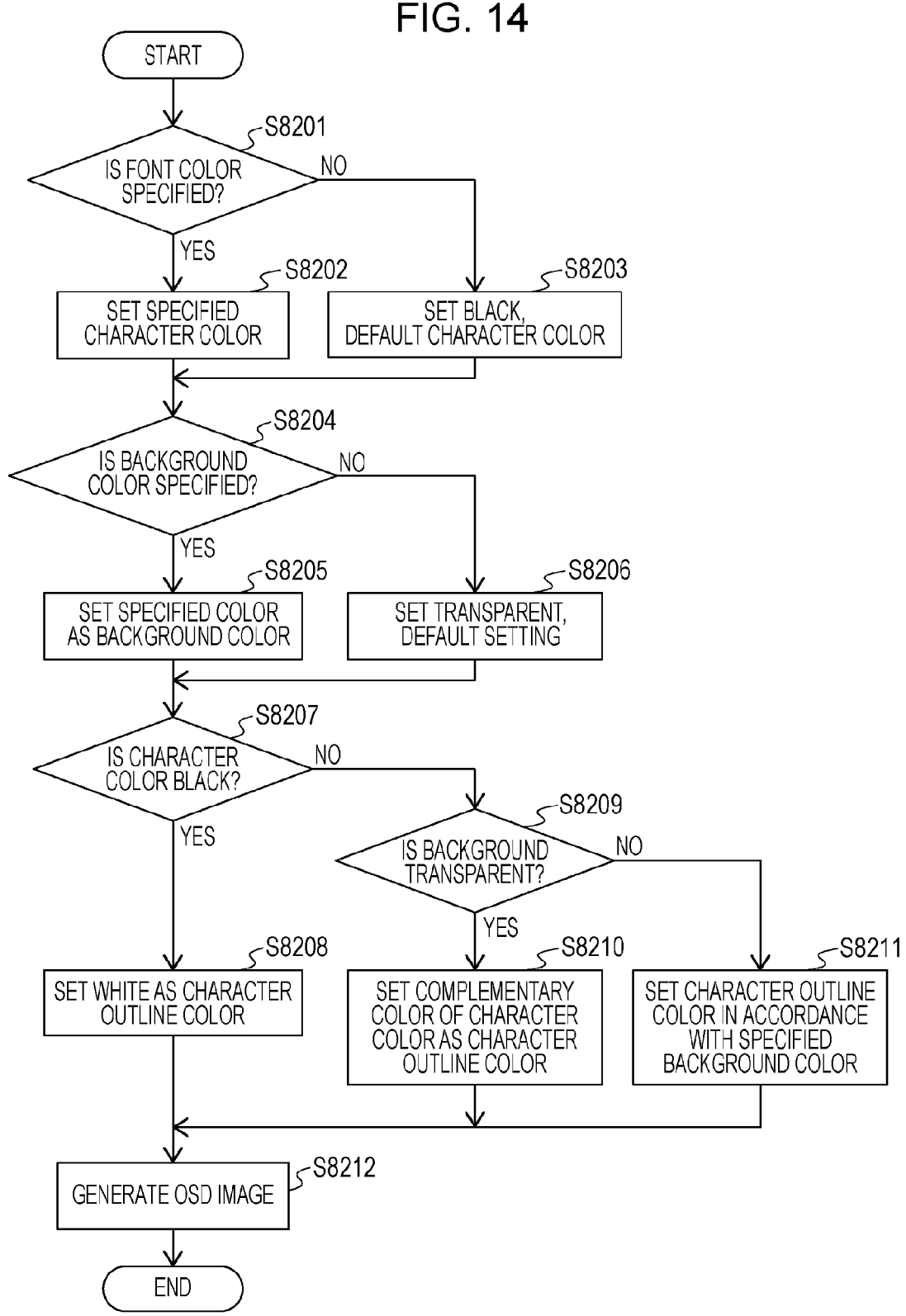
FIG. 14 is a flowchart illustrating an example of a process for generating an OSD image on the basis of a SetOSD command received by a monitoring camera according to a third embodiment of the present invention.

Next, FIG. 14 is a flowchart illustrating an example of a process for generating an OSD image on the basis of a SetOSD command received by the monitoring camera 1000 according to this embodiment. This process is executed by the control unit 1008. In addition, this process is begun by the control unit 1008 when the monitoring camera 1000 has received the SetOSD command.

Steps S8201 to S8203 illustrated in FIG. 14 are the same as the above-described steps S8001 to S8003, respectively, and accordingly description thereof is omitted.

Steps S8204 to S8206 are the same as the above-described steps S8105 to S8107, respectively, and accordingly description thereof is omitted.

In step S8207, the control unit 1008 determines whether the color of the characters included in the OSD image is black. If the control unit 1008 has determined that the color of the characters included in the OSD image is black, the control unit 1008 causes the process to proceed to step S8208. On the other hand, if the control unit 1000 has determined that the color of the characters included in the OSD image is not black, the control unit 1008 causes the process to proceed to step S8209.

The color of black in this embodiment is an example of a certain color. In addition, the control unit 1008 in this embodiment plays a role of a certain color determination unit that determines, in step S8207, whether the color of characters included in an OSD image match a certain color.

In step S8208, the control unit 1008 sets the outline color of the characters included in the OSD image to white.

In step S8209, the control unit 1008 determines whether the background of the characters included in the OSD image is transparent. If the control unit 1008 has determined that the background of the characters included in the OSD image is transparent, the control unit 1008 causes the process to proceed to step S8210. On the other hand, if the control unit 1008 has determined that the background of the characters included in the OSD image is not transparent, the control unit 1008 causes the process to proceed to step S8211.

In step S8210, the control unit 1008 sets the outline color of the characters included in the OSD image to the complementary color of the color of the characters.

In step S8211, the control unit 1008 sets the outline color of the characters included in the OSD image to the complementary color of the color of the background of the characters.

In step S8212, the control unit 1008 instructs the OSD generation unit 1007 to generate the OSD image.

If step S8202 has been executed after step S8201, the color of the characters included in the OSD image is a color corresponding to the Color field associated with the FontColor field subjected to the determination in step S8201. On the other hand, if step S8203 has been executed after step S8201, the color of the characters included in the OSD image is black, which has been set in step S8203.

In addition, if step S8208 has been executed after step S8207, the outline color of the characters included in the OSD image is white, which has been set in step S8208. If step S8210 has been executed after step S8209, the outline color of the characters included in the OSD image is the color set in step S8210.

Furthermore, if step S8211 has been executed after step S8209, the outline color of the characters included in the OSD image is the color set in step S8211.

If step S8205 has been executed after step S8204, the color of the background of the characters included in the OSD image is a color corresponding to the Color field associated with the BackgroundColor field subjected to the determination in step S8204. On the other hand, if step S8206 has been executed after step S8204, the background of the characters included in the OSD image is transparent.

Thus, the monitoring camera 1000 in this embodiment can dynamically set the outline color of characters included in an OSD image appropriately in accordance with the color of the characters and the color of the background of the characters.

For this reason, although there has been no command (interface) for specifying the color of outlines of characters included in an OSD image, it becomes possible to automatically set the color of the outlines of the characters included in the OSD image without providing such a command. As a result, a difference between the characters included in the OSD image and a background image of the characters becomes evident, thereby improving the visibility of the OSD image.

Fourth Embodiment

Next, a monitoring camera 1000 according to a fourth embodiment of the present invention will be described with reference to FIGS. 15 and 16. The same components as those according to the above-described embodiments are given the same reference numerals, and accordingly description thereof is omitted.

In the third embodiment, the monitoring camera 1000 that dynamically changes the outline color of characters included in an OSD image in accordance with both the font color and the background color specified by the SetOSD command has been described.

On the other hand, in the fourth embodiment, the SetOSD command is configured to be able to specify an outline color as well as the font color and the background color. The monitoring camera 1000 may be configured to dynamically change the outline color of characters included in an OSD image streamed to the client apparatus 2000 in accordance with the outline color specified by the SetOSD command.

Thus, if the client apparatus 2000 has specified the outline color in the SetOSD command, the monitoring camera 1000 can dynamically provide an OSD image. The fourth embodiment, which takes into consideration the above point, will be described hereinafter.

Next, FIG. 15 is a diagram illustrating the Extension field of an OSDConfigurationOptions type according to this embodiment, in which a data structure of an OutlineColor type, which is a unique data structure, is defined. The data structure is an example of the response used in the GetOSDOptions transaction 6054.

Since the data structure of the OutlineColor type is defined in the Extension field of the OSDConfigurationOptions type, the defined XML is a unique extension. In the Extension field, the data structure of the OutlineColor type is called "OutlineColor".

A prefix of OutlineColor is "aa", which is used for expressing a namespace corresponding to the data structure using a unique uniform resource identifier (URI).

As in the FontColor field and the BackgroundColor field, subelements in the OutlineColor field are defined using an OSDColorOptions type.

Setting values in the OutlineColor field include a Color field and a Transparent field. More specifically, in the OutlineColor field, the Color field is associated and described. In the Color field, a plurality of ColorList fields are associated and described.

The plurality of ColorList fields indicate ranges that can be specified in the Color field.

In the OutlineColor field, the Transparent field is associated and described. In the Transparent field, a Max field and a Min field are associated and described. Here, the value of the Min field is 0. The value of the Max field is 1.

The Min field and the Max field indicate a range that can be specified in the Transparent field. In FIG. 15, if the value of the Transparent field is 0, the OSD image is opaque, and if the value of the Transparent field is 1, the OSD image is completely transparent.

The client apparatus 2000 obtains the ranges of the setting values of OutlineColor illustrated in FIG. 15 by obtaining image superimposing setting options from the monitoring camera 1000 using a GetOSDOptions command (the command used in the GetOSDOptions transaction 6054).

By obtaining the ranges of the setting values, the client apparatus 2000 can set the outline color of characters included in an OSD image using the outline color as well as the color of the characters using the font color and the background color of the characters using the background color.

Figure 16:
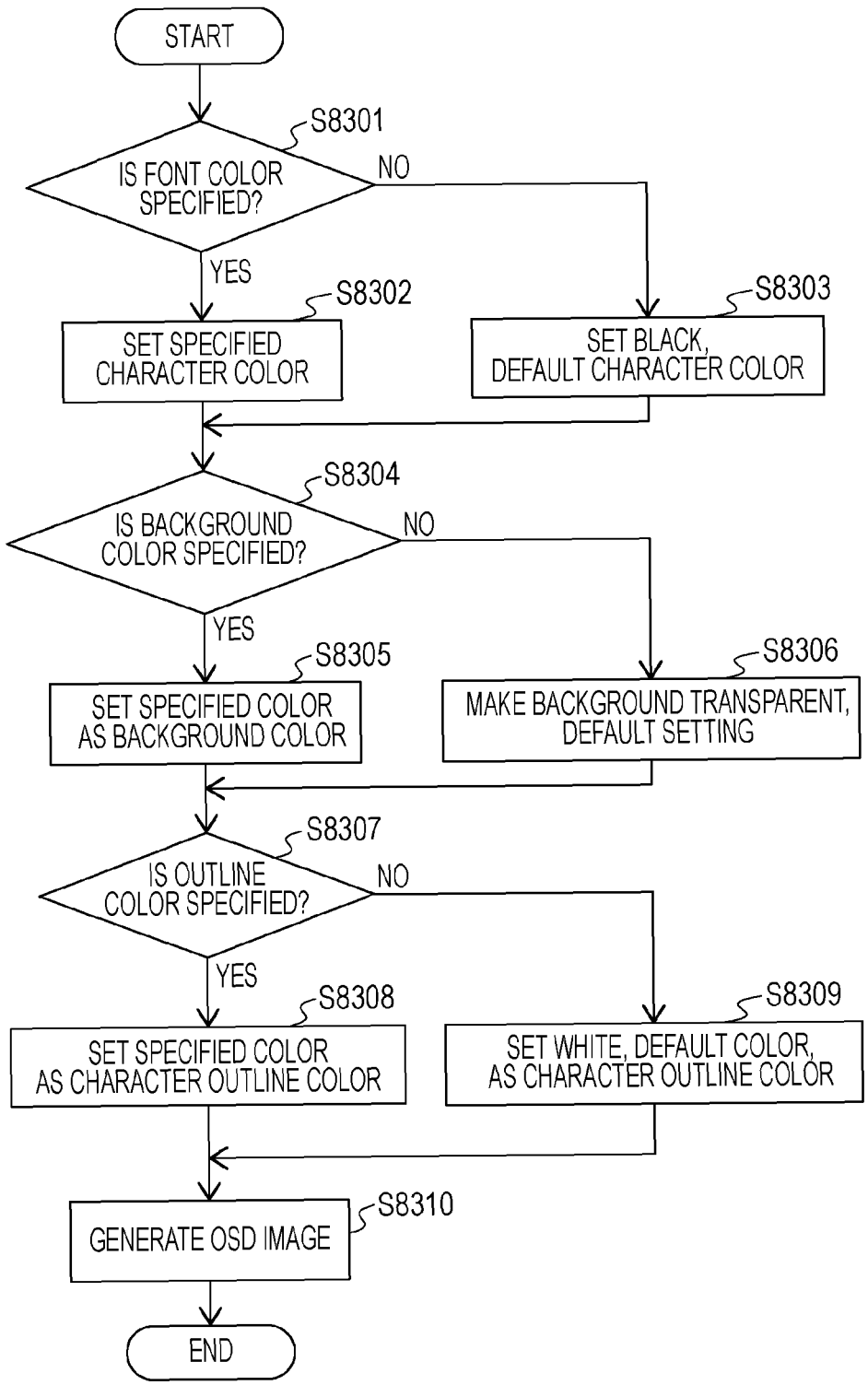
FIG. 16 is a flowchart illustrating an example of a process for generating an OSD image on the basis of a SetOSD command received by a monitoring camera according to a fourth embodiment of the present invention.

Next, FIG. 16 is a flowchart illustrating an example of a process for generating an OSD image on the basis of a SetOSD command including the outline color. This process is executed by the control unit 1008. This process is begun by the control unit 1008 when the monitoring camera 1000 has received the SetOSD command.

Steps S8301 to S8303 are the same as the above-described steps S8001 to S8003, respectively, and accordingly description thereof is omitted.

Steps S8304 to S8306 are the same as the above-described steps S8105 to S8107, respectively, and accordingly the description thereof is omitted.

In step S8307, the control unit 1008 determines whether the outline color is specified by the SetOSD command received by the communication unit 1005. For example, if a Color field associated with the OutlineColor field is described in the SetOSD command received by the communication unit 1005, the control unit 1008 determines that the outline color is specified.

On the other hand, if a Color field associated with the OutlineColor field is not described in the SetOSD command received by the communication unit 1005, the control unit 1008 determines that the outline color is not specified.

If the control unit 1008 has determined that the outline color is specified in the SetOSD command received by the communication unit 1005, the control unit 1008 causes the process to proceed to step S8308. On the other hand, if the control unit 1008 has determined that the outline color is not specified in the SetOSD command received by the communication unit 1005, the control unit 1008 causes the process to proceed to step S8309.

The control unit 1008 in this embodiment plays a role of a color information determination unit that makes the following determination in accordance with the SetOSD command received by the communication unit 1005. That is, the control unit 1008 determines whether the font color and the background color are specified in the SetOSD command or the font color, the background color, and the outline color are specified in the SetOSD command.

In step S8308, the control unit 1008 sets a color corresponding to the Color field associated with the OutlineColor field subjected to the determination in step S8307 as the outline color of the characters included in the OSD image.

In step S8309, the control unit 1008 sets white, which is the default color of the OutlineColor field, as the outline color of the characters included in the OSD image.

In step S8310, the control unit 1008 instructs the OSD generation unit 1007 to generate the OSD image.

If step S8302 has been executed after step S8301, the color of the characters included in the OSD image is a color corresponding to the Color field associated with the FontColor field subjected to the determination in step S8301. On the other hand, if step S8303 has been executed after step S8301, the color of the characters included in the OSD image is black, which has been set in step S8303.

If step S8308 has been executed after step S8307, the outline color of the characters included in the OSD image is the color set in step S8308. If step S8309 has been executed after step S8307, the outline color of the characters included in the OSD image is the color set in step S8309.

If step S8305 has been executed after step S8304, the color of the background of the characters included in the OSD image is a color corresponding to the Color field associated with the BackgroundColor field subjected to the determination in step S8204. On the other hand, if step S8306 has been executed after step S8304, the background of the characters included in the OSD image is transparent.

As described above, if the outline color is specified by the SetOSD command, the monitoring camera 1000 in this embodiment can set the outline color of characters included in an OSD image. As a result, a difference between the characters included in the OSD image and a background image of the characters becomes evident, thereby improving the visibility of the OSD image.

In step S8307 in this embodiment, the control unit 1008 is configured to determine, in the following case, that the outline color is specified. That is, it is the case where a Color field associated with the OutlineColor field is described in the SetOSD command received by the communication unit 1005.

Furthermore, in step S8307 in this embodiment, the control unit 1008 is configured to determine, in the following case, that the outline color is not specified. That is, it is the case where a Color field associated with the OutlineColor field is not described in the SetOSD command received by the communication unit 1005. The present invention, however, is not limited to these configurations.

For example, the control unit 1008 may be configured to determine, if the OutlineColor field is described in the SetOSD command received by the communication unit 1005 in step S8307, that the outline color is specified.

Furthermore, the control unit 1008 may be configured to determine, if the OutlineColor field is not described in the SetOSD command received by the communication unit 1005 in step S8307, that the outline color is not specified.

Although the setting of the Transparent field, which corresponds to the transparency of the OSD image, is omitted from the above-described embodiment, an object of the above-described embodiment can be achieved by setting the colors in the OSD image even if the setting of the Transparent field has been made.

Although the control unit 1008 is configured to begin the flowchart of FIG. 16 when the communication unit 1005 has received a SetOSD command, the operation performed by the control unit 1008 is not limited to this.

For example, the control unit 1008 may be configured to determine, when the communication unit 1005 has received a SetOSD command, whether the outline color is specified by the received SetOSD command.

Furthermore, the control unit 1008 may be configured to execute, if the control unit 1008 has determined that the outline color is specified by the received SetOSD command, the flowchart of FIG. 16. In addition, the control unit 1008 may be configured to execute, if the control unit 1008 has determined that the outline color is not specified by the received SetOSD command, the flowchart of FIG. 14.

According to this embodiment, an image capture apparatus or the like is provided capable of preventing the foreground color and the background color in a superimposed image from becoming similar to each other and characters in the superimposed image from becoming difficult to recognize.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-212751, filed Oct. 10, 2013, which is hereby incorporated by reference herein in its entirety.

What is claimed is:

1. An apparatus for communicating with an external apparatus through a network, the apparatus comprising:
an image capture unit configured to capture an image of a subject;
a superimposing unit configured to superimpose a superimposed image upon the captured image, the superimposed image including a character and a background;
a storage unit configured to store capability information in a memory, the capability information being associated with color information, which indicates a color relating to the superimposed image;

a transmission unit configured to transmit the capability information in accordance to requirement for the capability information from the external apparatus;

a reception unit configured to receive color information which is related to the capability information transmitted by the transmit unit;

a determination unit configured to determine whether the color information received by the reception unit includes a color of a background color; and a setting unit configured to set an outline color of the superimposed character based on the received color information, in case that the determination unit determines the color information includes the color of a background color.

2. The apparatus according to claim 1, wherein the setting unit sets the outline color of the superimposed character to a color of a background color received by the reception unit.

3. The apparatus according to claim 1, wherein the setting unit sets the outline color of the superimposed character to a color corresponding to a foreground color received by the reception unit.

4. The apparatus according to claim 1, wherein the setting unit sets the outline color of the superimposed character to a color different from a background color.

5. The apparatus according to claim 4, wherein the different color is a complementary color of a foreground color indicated by the received color information.

6. The apparatus according to claim 1, wherein the setting unit sets the outline color of the superimposed character to a color corresponding to a foreground color and a background color received by the reception unit.

7. A method for controlling an apparatus for communicating with an external apparatus through a network, the method comprising:

capturing an image of a subject;

superimposing a superimposed image upon the captured image, the superimposed image including a character and a background;

storing capability information in a memory, the capability information being associated with color information, which indicates a color relating to the superimposed image;

transmitting the capability information in accordance to requirement for the capability information from the external apparatus;

receiving color information which is related to the capability information transmitted from the external apparatus;

determining whether the received color information includes a color of a background color; and setting an outline color of the superimposed character based on the received color information, in case that the color information includes the color of a background color.

8. The method according to claim 7, wherein the setting sets the outline color of the superimposed character to a color of a background color.

9. The method according to claim 7, wherein the setting sets the outline color of the superimposed character to a color corresponding to a foreground color.

10. The method according to claim 7, wherein the setting sets the outline color of the superimposed character to a color different from a background color.

11. The method according to claim 7, wherein the setting sets the outline color of the superimposed character to a color corresponding to a foreground color and a background color.

12. The apparatus according to claim 1, wherein the setting unit sets the outline color of the superimposed character to a default color in case that the determination unit determines the color information does not include the color of a background color.

13. The apparatus according to claim 1, wherein the setting unit sets the outline color of the superimposed character based on a foreground color and a background color included in the color information, in case that the determination unit determines the color information includes the color of the background color and the foreground color.

14. A non-transitory computer readable medium storing a computer-executable program of instructions for causing a computer to perform a method for controlling an apparatus for communicating with an external apparatus through a network, the method comprising:

capturing an image of a subject;

superimposing a superimposed image upon the captured image, the superimposed image including a character and a background;

storing capability information in a memory, the capability information being associated with color information, which indicates a color relating to the superimposed image;

transmitting the capability information in accordance to requirement for the capability information from the external apparatus;

receiving color information which is related to the capability information transmitted from the external apparatus;

determining whether the received color information includes a color of a background color; and setting an outline color of the superimposed character based on the received color information, in case that the color information includes the color of a background color.

15. The non-transitory computer readable medium according to claim 14, wherein the setting sets the outline color of the superimposed character to a color of a background color.

16. The non-transitory computer readable medium according to claim 14, wherein the setting sets the outline color of the superimposed character to a color corresponding to a foreground color.

17. The non-transitory computer readable medium according to claim 14, wherein the setting sets the outline color of the superimposed character to a color different from a background color.

18. The non-transitory computer readable medium according to claim 14, wherein the setting sets the outline color of the superimposed character to a color corresponding to a foreground color and a background color.

* * * * *